United States Patent [19]
Yamanaka et al.

[11] Patent Number: 5,720,869
[45] Date of Patent: Feb. 24, 1998

[54] EQUIPMENT AND PROCESS FOR PRODUCING HIGH-PURITY WATER

[75] Inventors: Koji Yamanaka; Takashi Imaoka; Takashi Futatsuki; Yukinari Yamashita, all of Saitama, Japan

[73] Assignee: Organo Corporation, Tokyo, Japan

[21] Appl. No.: 548,986

[22] Filed: Oct. 27, 1995

[30] Foreign Application Priority Data

Oct. 28, 1994 [JP] Japan .................................. 6-265808

[51] Int. Cl.$^6$ .................................................. C02F 1/461
[52] U.S. Cl. ............................ 205/701; 205/742; 205/746; 205/748; 204/275; 204/263; 204/264
[58] Field of Search ............................ 205/742, 746, 205/748, 701; 204/275, 536, 263, 264, 632

[56] References Cited

U.S. PATENT DOCUMENTS

| | | |
|---|---|---|
| 4,828,660 | 5/1989 | Clark et al. ............... 205/746 |
| 5,510,009 | 4/1996 | Arai et al. ................ 205/746 |
| 5,543,030 | 8/1996 | Shiramizu et al. ......... 205/464 |
| 5,578,193 | 11/1996 | Aoki et al. .............. 205/746 |

*Primary Examiner*—Arun S. Phasge
*Attorney, Agent, or Firm*—Fish & Richardson P.C.

[57] ABSTRACT

A high-purity water producing equipment comprises a primary purification treatment system, a primary deionized water tank, a secondary purification treatment system for producing high-purity water from a primary deionized water, a circulatory system pipe for returning the produced high-purity water to a primary deionized water tank and a branch water feed system branched off from the circulatory system for feeding the high-purity water to a use point. An electrolytic unit for producing the anolyte EIW (electrolytic ionized water) to be catholyte EIW from the electrolysis of the high-purity water is provided as a bypass midway along the circulatory system. The anolyte EIW is added to the circulatory pipe downstream of the branching point toward the use point, when cleaning of units is necessary.

23 Claims, 15 Drawing Sheets

EQUIPMENT AND PROCESS FOR PRODUCING HIGH-PURITY WATER

BACKGROUND OF THE INVENTION

1. Field of the Invention

The present invention relates to the production of high-purity water used for cleaning articles which require a highly pure surface, such as a semiconductor wafer.

2. Description of the Related Art

Thus far, as water for cleaning articles which are required to obtain a highly pure surface, such as a semiconductor wafer; highly purified water has been used, generally called high-purity water, from which such contaminants as microparticles, colloidal substances, organic matter, metals and various ions are removed to as great an extent as possible.

This highly purified water, called high-purity water, is not necessarily defined as "high-purity water", but equipment for producing high-purity water is generally known, and comprises: a pretreatment unit provided for clarifying raw water by using a coagulator, a sand filter apparatus or the like; a primary purification treatment section provided for removing contaminants in the pretreated water by using an active-carbon adsorption apparatus, a reverse osmosis apparatus, a two bed ion exchange system, a vacuum degasifier, a mixed-bed ion exchanger, a micronic filter or the like; a primary deionized water tank for temporarily storing the deionized water obtained in the primary purification treatment section; and further a secondary purification treatment section provided for removing trace amounts of such contaminants as microparticles, colloidal substances, organic matter, metals and ions remaining in the primary deionized water to as great an extent as possible by using a UV irradiator, a mixed-bed polisher, or such a membrane separation apparatus as an ultrafiltration membrane apparatus or reverse osmosis apparatus at the final stage.

Incidentally, on an industrial scale of implementation, the conventional high-purity producing equipment as described above is usually designed so that there is only a little excess production which conforms to the upper limit of usage, so that continuous use of the high-purity water is ensured. For this reason, it is inevitable, when using less than the upper limit, that some of the high-purity water excessively produced is wasted unless appropriate uses are found.

Thus, an arrangement is often employed in which high-purity water is produced from the deionized water stored in a primary deionized water tank as feed water, by using a secondary purification treatment section, and returned through a circulating pipe to the primary deionized unit (hereinafter, the system for returning to the primary deionized section will be referred to as the "return side"). In practice, high-purity water produced is arranged so as to be supplied through branching pipes provided as branches midway along this circulating pipe to points of use such as semiconductor cleaning installations or the like.

The amount of water returned through the return side of said circulatory pipe to a primary deionized water tank ordinarily amounts to the order of 10 to 30% of the amount of water supplied from a secondary purification treatment section, but when use of high-purity water at the point of use stops, the total amount of supplied water is temporarily returned through the return side of the circulatory pipe to the primary deionized water tank.

In the meantime, in addition to the above-mentioned basic arrangement for producing high-purity water, installations for sterilization or microparticle removal are appended in many cases. This is attributed to the following reasons:

Generally, with high-purity water producing equipment, especially in a secondary purification treatment section, the intra-system flow water is deionized or high-purity water with an extremely low level organic matter and salts, nutrients for living microorganisms, and moreover an apparatus for performing continuous sterilization by UV irradiation or the like is also provided in the system. However, if a long-duration circulation of high-purity water is continued, living microorganisms stick to and proliferate on the inner wall of the high-purity water circulatory pipe and the membrane surface of the membrane separation treatment apparatus and consequently living microorganisms proliferate in high-purity water circulated or supplied, and microparticles generated by living or dead microorganisms increase. Especially, in the pipe downstream of the circulatory pipe and in the primary deionized water tank, proliferation of living microorganisms is likely to occur.

The causes of this are thought to be living microorganisms derived from the feed water brought in from the primary purification treatment section, living microorganisms reversely mixed from the outlet in points of use, or living microorganisms mixed in when the interior of apparatus of the secondary purification treatment section or the inner wall of the circulatory pipe are exposed to the outside while high-purity producing equipment is stopped on account of reconstruction work or the like, but the exact cause is not always clear.

In addition, although the return side of a circulatory piping uses a pipe having much the same diameter as that of the feed side, the flow speed in the pipe becomes slow in many cases because an ordinary flow rate from the membrane separation treatment apparatus is in the order of 10 to 30% of the feed rate as described above, so that living microorganisms seem to stick to and proliferate on the inner wall of the return side of the circulatory piping. Furthermore, in the primary deionized water tank, it seems that it is more probable for living microorganisms to stick to and proliferate on the inner wall of the tank, because the length of time the water stays in the tank is longer than that observed in the circulatory pipe.

When a pipe used for the secondary purification treatment unit, the primary purification treatment unit or the circulatory piping, is polluted with living microorganisms or microparticles as a result of aging due to the long-term operation of equipment or by external causes such as immediately after work for equipment construction or for equipment maintenance, it is impossible to obtain cleaning water for cleaning articles which require a highly clean surface, such as a semiconductor wafer, and therefore something like sterilization or microparticle reduction treatment must be carried out. Thus, for the above sterilization or microparticle reduction treatment, for example, the following operation has so far been carried out:

(1) Sterilization treatment

1. For example, after periodically stopping the high-purity water producing equipment once every two or so months, sterilization with chemicals, e.g., by circulation of 1% to 2% hydrogen peroxide water or less than 0.1% hydrofluoride acid, is performed.
2. For example, after periodically stopping the high-purity water producing equipment every two or so months, sterilization is performed, e.g., by circulation of 90° C. to 95° C. hot water.
3. For example, after periodically stopping the high-purity water producing equipment every two or so months, sterilization is performed by the combination of methods 1 and 2.

4. Without stopping the high-purity water producing equipment, sterilization is performed by injecting ozone gas obtained by an ozone generator directly into the return side of the circulatory piping, or by injecting ozone water, made of ozone gas obtained by a ozone generator dissolved in high-purity water, into the return side of the circulatory piping and the primary deionized water tank.

Incidentally, at that time, there is a possibility that an ion exchange resin used in the secondary purification treatment section or a membrane separating treatment apparatus is continuously exposed to ozone and is deteriorated by oxidization if an excess of ozone remains at the outlet of the primary deionized water tank. An excess of ozone is decomposed into less oxidative oxygen by UV irradiation at the outlet of the primary deionized water tank. Furthermore, if the dissolved oxygen generated at that time is harmful to the object to be cleaned, a hydrogenation reaction is performed on a catalyst by addition of hydrogen gas after the UV irradiation. If this is not done, deoxidizing treatment is performed with a vacuum degasifier or a degasifying membrane apparatus.

(2) Microparticle reducing treatment

Because it is also effective for the reduction of microparticles, the above sterilization is executed for the reduction of microparticles and blowdown with high-purity water is carried out until the number of microparticles is lowered to a predetermined value.

FIGS. 14 and 15 show conventional examples of high-purity water producing equipment equipped with cleaning installations for such sterilizing treatment and microparticle reducing treatment as described above. In both figures, after being subjected to the pretreatment in a pretreatment unit 1, and to the primary purification treatment in a primary purification treatment section, the treated water is stored in the primary deionized water tank 4 as primary deionized water. The primary deionized water of the primary deionized water tank 4 is further treated in a secondary purification treatment section 5 and high-purity water is obtained. The high-purity water obtained in the secondary purification treatment unit 5 is returned through a circulatory pipe to the primary deionized water tank 4, while some of it is branched off from the circulatory pipe and fed to points of use.

In addition, a cleaning liquid tank 6 is provided in a bypass of the primary deionized water tank 4. Cleaning liquid is fed to the cleaning liquid tank 6 from a chemical feeder (a deionized water heating tank) 61. When cleaning is required, the cleaning liquid from the chemical feeder 61 is allowed to flow through the secondary purification treatment section 5 to clean it, when the cleaning water is drained from the secondary purification treatment section 5 to the outside of the system through the circulatory pipe. Incidentally, a bypass route is provided to an ion exchange column and a flow water is changed over to flow through the bypass at the time of cleaning by a change-over valve not shown so that the cleaning liquid does not flow through the ion exchange column.

In the meantime, in the equipment of FIG. 14, the secondary purification treatment section 5 comprises a UV irradiator 501, a non-regenerative type mixed-bed ion exchange column 502 and an ultrafiltration apparatus 503.

Furthermore in FIG. 15, an ozone dissolving apparatus 551 for dissolving the ozone from the ozone generation apparatus 552 into high-purity water is provided on the return side of the circulatory piping (downstream of the branch to a point of use). Incidentally, it is also allowable to dissolve ozone gas directly in the circulating high-purity water or to mix the ozone water obtained by dissolving ozone gas in high-purity water with the circulating high-purity water.

In this way, by dissolving ozone in the circulatory high-purity water, the primary deionized water on the return side of the circulatory piping and in the primary deionized water tank can be sterilized. With the equipment of FIG. 15, in addition to the UV irradiator 501, the non-regenerative type mixed-bed ion exchange resin column 502 and the ultrafiltration apparatus 503 similar to those provided in FIG. 14, a hydrogen dissolution apparatus 553 and a hydrogenating catalytic column 505 are provided between the UV irradiator 501 and the non-regenerative type mixed-bed ion exchange resin column 502. Incidentally, the hydrogen from the hydrogen gas storage tank 554 is fed via a hydrogen gas purification apparatus 555 to the hydrogen dissolution apparatus 553.

Thus, the ozone remaining in the primary deionized water from the primary deionized water tank is decomposed into less oxidative oxygen with the aid of the UV irradiator 501. Then, by dissolving hydrogen in the irradiated water at the hydrogen dissolution apparatus 553 behind this UV irradiator 501 and reacting oxygen with hydrogen on the catalyst of the hydrogenating catalytic column 505, ozone is finally changed into water. In this equipment of FIG. 15, cleaning can be carried out in the continuous operation scheme.

As described above, to execute the sterilizing or microparticle reducing treatment of the intra-system apparatus or piping and further circulatory piping, a conventional high-purity water producing equipment has employed the methods 1 to 3 by periodically stopping the operation of the producing equipment and passing chemicals, heated water or warmed chemicals through the pipes as representatively shown in FIG. 14, but these methods have the following problems:

a) In cases of using chemicals, there is a possibility that constituent materials, such as membrane means and piping materials, used for the secondary purification treatment section, primary deionized water tank and circulatory piping will be deteriorated, and accordingly, using chemical-resistant piping and constituent materials is required, thereby restricting the selection of constituent materials and leading to a disadvantage in cost. In addition, it takes rather a long time to wash out chemicals from the system after the sterilizing treatment and the stopped time of a high-purity producing equipment is prolonged.

Furthermore, it is necessary to have appended installations, such as a sterilizing chemical regulating tank and pump, in addition to the primary deionized water tank, and the cost for this becomes very large.

b) In cases of using hot water, when the temperature goes up or down, there is a fear that constituent materials, such as membrane means and piping materials, used for the secondary purification treatment unit, primary deionized water tank and circulatory piping are excessively expanded or contracted and their durability lowers due to mechanical and thermal stress. Thus, it is necessary to use heat-resistant materials, free from an excess of deterioration due to hot water, is required.

Furthermore, it is necessary to have appended installations, such as a hot water tank and pump, provided in addition to the primary deionized water tank, and the cost for this becomes very large.

c) With the above methods 1 to 3, since the production of secondary deionized water is interrupted for sterilization, using high-purity water at points of use must be temporarily stopped and consequently the cleaning throughput of articles to be cleaned using high-purity water deteriorates. Thus, the frequency of sterilization is required to be minimized, but this requirement raises a further important problem in that the number of living microorganisms increases in inverse proportion to a decrease in the frequency of sterilization. To prevent this, spares of high-purity producing equipment must be provided, and the cost for them becomes very large.

On the other hand, with the conventional method 4 shown in FIG. 15, the sterilization treatment and microparticle reduction treatment of the intra-system apparatus and piping in the high-purity water producing equipment, and further piping used for the circulatory line, executable without the need for interrupting the operation of the high-purity producing equipment, present the following problems critical for practical equipment on an industrial scale, which hinders the actual prevalence of the relevant method:

d) Because the ozone gas obtained by an ozone generator is injected, the above method 4 needs a dissolution apparatus for dissolving the ozone gas into the return water and moreover a large quantity of such contaminants as microparticles and metal ions generated from a conventional silent electric type ozone generator are contained in the ozone gas, so that direct injection of ozone gas causes a large quantity of microparticles and metals to be mixed into the return water, thereby deteriorating the performance of the mixed-bed type polisher and the membrane apparatus in the secondary deionized water unit due to clogging or the like. Thus, the ozone gas obtained by a conventional silent electric discharge scheme or the like must be filtered in the gaseous state.

e) In a method for preparing ozone gas by taking out pure ozone gas generated by the electrolysis scheme, with the aid of a gas-liquid separation membrane and removing impurities, it is necessary to dissolve ozone gas into contaminant-free deionized water using an ozone dissolution apparatus provided at a position preceding the injection point or to do so separately before usage.

f) The object of this method of using ozone gas lies in performing continuous sterilization to decrease the frequency of periodic chemical cleaning. Since, in continuously flowing to the secondary purification treatment unit and the subsequent parts, ozone must be eliminated at the front of the ion exchanger in which no flow of ozone water is allowed, and further in applications where the presence of not only ozone but also dissolved oxygen must be avoided, not only ozone but also oxygen as reduction product of ozone must be removed. Elimination of ozone can be accomplished with a UV irradiator, but nevertheless a conventional vacuum degasifier has a disadvantage that a large-sized apparatus must be used for removing an infinitesimal level of oxygen. On the other hand, removal of oxygen by using the hydrogen injection and hydrogenating catalyst is difficult to employ from the standpoint of countermeasure against explosion on account of the use of hydrogen, even if it is possible on a laboratory scale, and consequently such apparatus has not yet been implemented inside the system of high-purity water producing equipment on an industrial scale.

SUMMARY OF THE INVENTION

The present inventors have been carrying out in depth studies, and here conceived this invention to realize cleaning for the sterilization and microparticle reduction of intra-system apparatus and piping in the secondary purification treatment unit, the primary deionized water tank, and the circulatory piping, which has been regarded as a problem to be solved in conventional high-purity water producing equipment, and also to realize the continuous sterilization and cleaning applicable to equipment on the industrial scale.

That is, considering that ozone-dissolved anolyte electrolytic ionized water (EIW), free from microparticles or other contaminants, or hydrogen-dissolved catholyte EIW, can be obtained from electrolysis by introducing, a DC current to deionized water or high-purity water in an electrolytic apparatus, it is one object of the present invention to provide a process and producing equipment for high-purity water enabling cleaning for an effective sterilization and microparticle reduction to be implemented completely without use of conventional chemicals or hot water, by introducing the ozone-dissolved anolyte EIW free from microparticles or other contaminants to such an apparatus to be cleaned as a primary deionized water tank and to the piping line.

It is another object of the present invention to provide a process and producing equipment for high-purity water enabling the above object to be implemented more effectively by adding an electrolyte or electrolytes to the feed water (deionized water or high-purity water) in an electrolytic bath disposed in in-line form inside the system of the high-purity water production equipment, or to the EIW after electrolysis.

It is still another object of the present invention to provide a process and producing equipment for high-purity water suitable to cases of temporarily interrupting the production of high-purity water and executing the cleaning for sterilization and microparticle reduction of the intra-system apparatus or piping line.

It is yet another object of the present invention to provide a process and producing equipment for high-purity water enabling the cleaning of the intra-system apparatus or piping line to be executed on an industrial scale while continuing the production of high-purity water.

It is a further object of the present invention to provide a process and producing equipment for high-purity water, highly useful from an industrial standpoint in that the ozone-containing water used for cleaning of the intra-system apparatus or piping line can be made harmless by using the catholyte EIW simultaneously obtained in the electrolytic bath without the need for an appended installation to be specially provided, and consequently the burden of installations for storage and feeding of hydrogen requiring countermeasures against explosion can be relieved.

Among the processes for high-purity water which use the secondary purification treatment having ion exchange means and membrane treatment means after the pretreatment to remove suspended solids contained in feed water, followed by the primary purification treatment to remove ions and non-ionic substances, a process for high-purity water according to the present invention is characterized by electrolyzing the primary deionized water produced using the primary purification treatment or the secondary deionized water or high-purity water produced the progress of secondary purification treatment for the purpose of producing EIW for intra-system cleaning.

The electrolysis to be performed on the primary deionized water produced by the primary purification treatment or the secondary deionized water or high-purity water produced during the progress of secondary purification treatment simply refers to the application of a DC voltage to water or an aqueous solution in the present specification, and does not always mean only a case where DC current flows as a result of the application of the voltage and such electrolytic reaction as decomposition of water into oxygen and hydrogen occurs. It can be cited as examples to produce the anolyte and the catholyte EIW with an electrolytic unit as shown in FIGS. 9 to 13. The electrolytic unit is not restricted in its structure to a two-bath electrolytic unit comprising an anode chamber and a cathode chamber separated by a diaphragm, or a three-bath electrolytic unit further comprising an intermediate chamber separated from the adjacent chambers by the respective diaphragms. Incidentally, the following denominations will be employed in the subsequent description of electrolytic units: the positively applied electrode to which a positive voltage is applied will be referred to as the anode, the electrode to which a negative voltage is applied will be referred to as the cathode, the disposed chamber of the anode as the anode chamber, the disposed chamber of the cathode as the cathode chamber, the water obtained from the anode chamber in electrolysis as anolyte EIW, the water obtained from the cathode chamber in electrolysis as catholyte EIW and further both anolyte and catholyte collectively as EIW.

Because oxides, ozone and the like are generated near the surface of the anode, the anolyte EIW indicates an oxidative property and is consequently useful as cleaning water for sterilization. On the other hand, because hydrogen and the like are generated near the surface of the cathode, the catholyte EIW indicates a reducing property and is consequently useful as cleaning water for removing attached microparticles. Incidentally, the term "cleaning" in the subsequent description will be applied to the case of performing sterilization and/or microparticle reduction treatment collectively.

In the high-purity water producing equipment, the term "pretreatment" means any treatment of coagulation/sedimentation, filtration, in-line coagulation/filtration, activated carbon adsorption, membrane turbidity removal, or the like.

Similarly, the term "primary purification treatment" means a treatment for obtaining deionized water in which the contaminants in the pretreated water are removed by using an appropriate combination of active carbon adsorption, reverse osmosis, two-bed ion exchange, a vacuum degasified, mixed-bed ion exchange, electrically regenerative type ion exchange, micronic filtration or other primary purification methods, and more generally to a treatment for obtaining deionized water having a conductivity of not more than 10 μS/cm, but it is not limited to this.

Furthermore, the term "secondary purification treatment" is not limited but means a treatment for removing such contaminants as microparticles, colloidal matter, organic matter, metals and ions etc., remaining at extremely low levels in the primary deionized water using UV irradiation, a mixed-bed polisher or membrane separation using an ultrafiltration membrane, reverse osmosis membrane, or the like.

As examples of "feed water", city water, industrial water and groundwater can be mentioned.

According to these methods, by supplying at least one of the anolyte EIW and the catholyte EIW obtained by electrolysis to the top or intermediate position of the secondary purification section, or downstream of the position of the electrolysis apparatus, cleaning can be accomplished. The waste water from cleaning is discharged from the downstream end of the second purification treatment section or from the circulatory system to the outside of the system on condition that the feed to the points of use are kept interrupted. Incidentally, as regards the apparatus provided in the secondary purification system for ion exchange treatment, a bypass pipe is preferred to prevent the electrolytic water from flowing through ion exchange resins.

In methods for performing the secondary purification treatment by ion exchange means and membrane separation means, after the pretreatment to remove suspended solids contained in feed water followed by the primary purification treatment to remove ions and non-ionic substances, and branching and feeding the high-purity water after the secondary purification treatment to a point of use from the midpoint of the circulatory system for recirculation to the upstream end of the secondary purification section, another feature of a process for high-purity water according to the present invention is an arrangement for electrolyzing the high purity in the circulatory system for circulating the high-purity water after the secondary purification treatment in order to produce the EIW for intra-system cleaning.

According to this process for high-purity water, cleaning can be executed by passing the EIW into the pipe on the return side of the circulatory system, or further to the primary deionized water tank if necessary, and moreover to the secondary purification treatment system. Discharge of waste water to the outside of the system after the completion of cleaning, and the bypass flow of the EIW to avoid it contact with the ion exchanger is recommended, similarly to the above case.

According to these methods, sterilization of predetermined intra-system apparatus and pipes, including the circulatory pipe, can be carried out by using the anolyte EIW dissolving ozone but not mixed with microparticles or other contaminants. In addition, adhering microparticles can be removed from predetermined intra-system apparatus and pipes, including the circulatory pipe, by using the catholyte dissolving hydrogen but not mixed with microparticles or other contaminants.

Also, the present invention can provide equipment enabling the process mentioned above to be appropriately executed.

Among high-purity producing pieces of equipment according to the present invention comprising: a pretreatment unit equipped with clarification means for removing suspended solids contained in feed water; a primary purification treatment section equipped with membrane separation treatment means or the like for obtaining deionized water from the membrane separation means; or a secondary purification treatment section equipped with a primary deionized water tank for storing the primary deionized water, ion exchange means, membrane separation means or the like for obtaining high-purity water from the primary deionized water having passed through the primary deionized water tank, one feature of high-purity water producing equipment according to the present invention is an arrangement whereby an electrolytic unit operable at the time of need for intra-system cleaning for producing the anolyte and/or catholyte EIW from electrolytic treatment by using the primary deionized water or the secondary deionized or high-purity water during the progress of primary or purification treatment and letting the produced anolyte and/or catholyte EIW flow, via a bypass pipe, at any position inside the secondary purification treatment system.

The clarification means used as an apparatus for the pretreatment in the above process is, for example, a coagulation/sedimentation apparatus, filtration apparatus, in-line coagulation/filtration apparatus, activated carbon adsorption apparatus or membrane turbidity removal apparatus.

As membrane separation treatment means of the primary purification treatment system, for example, a reverse osmosis membrane apparatus or micronic filter can be adopted, but usable means are not limited to these. In addition, for achieving the primary purification treatment in the above process, this primary purification treatment section can include an activated carbon adsorption apparatus, deionization means such as a two-bed ion exchange system, a mixed-bed ion exchanger and electrically regenerative type ion exchanger, or various appropriate and necessary means such as decarbonation and vacuum degasification, vessels.

As ion exchange means in the secondary purification treatment section, for example, a mixed-bed polisher is used, whereas an ultrafiltration membrane or reverse osmosis membrane, for example, is used as membrane separation means. Furthermore, the secondary purification treatment system can include various appropriate and necessary means for UV irradiation treatment, vacuum degasification or the like.

In the above equipment, an electrolytic unit can be provided in any of the following three points, as a bypass of the pipe preceding the primary deionized water tank, as a bypass of the primary deionized water tank, as a bypass of the pipe between the primary deionized water tank and the second purification treatment section or as a bypass of any pipes or apparatuses in the secondary purification treatment, and is operated at the time of need for intra-system cleaning. Incidentally, a change-over valve is also provided in such a manner that water can flow through the bypass route at the time of intra-system cleaning. As described in the above process, the EIW after the completion of cleaning is discharged from the downstream end of the secondary purification treatment system or from a predetermined position of the circulatory system.

An electrolytic unit to be used in equipment according to the present invention produces at least one of the anolyte and catholyte EIW from electrolytic treatment by using the primary deionized water or high-purity water (including the treated water in the process of secondary purification treatment) and providing the produced anolyte and/or catholyte EIW at any position inside the secondary purification treatment section, the anolyte EIW alone being used for the purpose of sterilization and the catholyte EIW alone being used for the purpose of cleaning removal of microparticles. When passing both of them, it is preferred to pass the catholyte EIW after passing the anolyte EIW. This is because passing the electrolytic water in this sequence enables the sterilization and microparticle reduction to be effectively executed as a result of killing the living microorganisms sticking and proliferating in the system by using the anolyte EIW, and then cleaning and removing the killed microorganisms (which can be regarded as microparticles).

In the above arrangement, when discharging the waste water from the downstream end of the secondary purification unit or from the circulatory line to the outside of the line after passing the anolyte EIW through the intra-line downstream thereof, the catholyte EIW can be mixed into the discharged waste water. In this manner, the oxidizing power of the oxidative substances (ozone and the like) contained in the discharged water can be reduced by the reducing substances contained in the catholyte EIW, and therefore there is an advantage that the treatment in the waste water discharge system can be simplified. Conversely, when discharging the waste water from the downstream end of the secondary purification unit or from the circulatory line to the outside of the line after passing the catholyte EIW through the intra-line downstream thereof, the anolyte EIW can be mixed into the discharged water.

With an alternative high-purity water producing equipment comprising: a circulatory line for returning the high-purity water obtained in the secondary purification section to the primary deionized water tank; and a branch water feed system branched off from a part of this circulatory line for feeding the high-purity water to a point of use, an electrolytic unit can be provided as a bypass midway on the circulatory line in such a manner that at least one of the anolyte EIW and catholyte EIW is produced from electrolysis of high-purity water used as feed water, and passed to the intra-line downstream from the downstream position of the branch section of the circulatory line to a point of use.

Only one of the anolyte EIW and the catholyte EIW may be passed through the downstream portion of the circulatory line or both of them can be passed therethrough. In the case of passing both therethrough, the two types of electrolytic water can be alternatively passed by change-over means.

In a case where an electrolytic unit is provided in the circulatory line, as described above, EIW is not limited to being passed through the downstream portion of the circulatory line and forward, and by arranging the anolyte EIW to flow through the secondary purification section, this EIW can be passed through the pipe on the return side of the circulatory line, the primary deionized water tank and the secondary purification section in sequence. In the mean time, when being passed down to the secondary purification section, the anolyte EIW is passed down to the upstream position of ion exchange means in the secondary purification section and the anolyte EIW is preferably reduced sufficiently so as not to cause the deterioration of ion exchange resin in the ion exchange means. For this reduction of the anolyte, the catholyte EIW produced in the electrolytic unit can be used. When a mixing means for the catholyte EIW is provided by utilizing a pipe and a change-over valve and further, by disposing a hydrogenation catalyst at the downstream stage of this catholyte EIW mixing position, the oxidative power of ozone and oxygen contained in the anolyte can be sufficiently removed so as not to cause the deterioration of ion exchange resin.

Incidentally, the amount of catholyte EIW to be added can not be determined uniformly because it is dependent on not only the initial quantity of ozone contained in the anolyte produced with the electrolytic unit, but also the quantity of ozone consumed during passage through the pipe and the like. However, it can be easily confirmed empirically and therefore the mixing amount of catholyte can be determined in accordance with experimental data. In the case of using this equipment, cleaning can be carried out while the anolyte is continuously passed through.

A high-purity water producing equipment according to another aspect of the present invention, comprising a pretreatment unit, a primary purification treatment section and a secondary purification treatment section like the one described above, is characterized in that, when this secondary purification system is equipped with a UV irradiating means, an electrolytic unit is provided upstream of (especially immediately before) the UV irradiating means, anolyte EIW is electrolytically produced by using the primary deionized water or the treated water during the progress of secondary purification treatment as feed water, and the anolyte EIW produced is arranged so as to flow through the UV irradiating means.

According to the high-purity water producing equipment arranged in this manner, the ozone-contained catholyte EIW flows through the UV irradiator and consequently there are obtained not only an advantage that the sterilization and organic-matter decomposition under action of UV irradiation is more effectively accomplished but also the operation of an increase in the removal capability of silica as a result of enhanced ionization of colloidal silica.

The electrolytic unit, provided upstream of the UV irradiator, can be provided as a bypass midway on the circulatory line for returning the high-purity water obtained in this second purification section to the primary deionized water tank, in which case a similar effect is also achieved.

When the anolyte EIW has passed through this UV irradiator, chemical or physical deoxidizing means is provided preferably at the downstream end of the UV irradiator. As chemical deoxidizing means, a combination of means for mixing the catholyte produced in an electrolytic unit with the effluent from the UV irradiating means and a hydrogenation catalytic column provided downstream of this mixing means can be adopted, whereas such a degasifier as a membrane degasifier or a vacuum degasifier can be adopted as physical deoxidizing means.

According to the above system, the anolyte EIW can be continuously passed through the UV irradiator.

An electrolytic unit to be used for each of these high-purity producing equipment can utilize deionized water or high-purity water as feed water, as mentioned above, but can also be arranged to electrolyze the electrolyte aqueous solution obtained after adding an electrolyte or electrolytes to the feed water.

As an electrolyte(s) to be added to the feed water to either the anode or to the cathode chamber, any substance can be chosen from among various acids, bases or salts, or a mixture of these at any ratio in accordance with the purpose, and the concentration thereof is not limited but can usually be set to the range generally between 0.001 mg/l and 100 g/l, preferably between 0.01 mg/l and 10 g/l. As acids, for example, an inorganic acid, such as hydrochloric acid, sulfuric acid, carbonic acid or nitric acid, and an organic acid, such as acetic acid, citric acid or oxalic acid, is used, as bases, ammonia, amines or other organic bases can be used. As an electrolyte(s), in addition to these mentioned above, salts having a buffer function, e.g., ammonium salts, carbonates and citrates, or a mixture of these salts with any acid or base can be used, and consequently the effect of such electrolytic conditions as electrolytic current on the pH of EIW can be minimized, thereby making it easier to set the property of the anodic and catholyte independently.

Addition of an electrolyte(s) can be made to both the anode chamber (anolyte) and the cathode chamber (catholyte) or to only one of them. With equipment chiefly for sterilization, electrolyte addition means is recommended to be provided on the anode chamber because only an acidic and oxidative anolyte EIW is desired to be produced, whereas electrolyte addition means is recommended to be provided on the cathode chamber with equipment chiefly for the reduction of microparticles because only a basic and reducing catholyte EIW is desired to be produced.

In addition, these electrolytic units for high-purity water are not limited to a definite type, such as a two bath type, three bath type or the like, but a three bath type electrolytic unit, comprising an anode chamber, a cathode chamber and an intermediate chamber, wherein each chamber is partitioned with ion exchange membranes made of solid electrolyte is preferably used. As such a three bath type electrolytic unit, an arrangement wherein the intermediate chamber is filled with ion exchange resin and/or the anode electrode and the cathode electrode are in contact with ion exchange membranes partitioning the intermediate chamber can be preferably adopted.

Furthermore, at the downstream end of an electrolytic unit, a filter, e.g., having an opening diameter (pore size) of 1 μm or less, is preferably provided for filtering EIW.

In so far as these electrolytic units are resistant to feed water or an electrolyte(s) to be fed, and to the produced EIW, there is no limit to their material of construction, but the constituent materials from which no microparticles leach out are preferably employed because EIW substantially free from microparticles should be produced using primary deionized water as feed water. For example, as a structure material, a preferred material can be chosen from among organic material, such as polyvinyl chloride (PVC), polypropylene (PP) and acrylic resin, inorganic material, such as ceramics and glass, and a metallic material with surface treatment, such as rubber lining or oxide film treatment, applied to the liquid contact surface, while as a diaphragm, for example, a filter, porous filter or ion exchange membrane or the like made of a macromolecular material, such as cellulose, polyethylene, polypropylene, polyester, polystyrene, and fluoride resin, or inorganic material, such as ceramics can be used. Using an ion exchange membrane lowers the electrolytic voltage on account of its good conductivity, thereby enabling the consumed power to be reduced when the electrolysis is carried out with a constant electrolytic current. Furthermore, with an arrangement wherein the electrode and the ion exchange membrane are brought into full contact with each other, there is obtained an advantage that the electrolytic voltage is further lowered and the consumed power can be reduced. When a cation exchange membrane is used for the diaphragm partitioning the anode chamber and the intermediate chamber, and an anion exchange membrane is used for the diaphragm partitioning the cathode chamber and the intermediate chamber, the ion excluding effect peculiar to the respective membranes enables the quantities of oxidative and reducing substances that diffuse respectively from the anode and cathode chambers to the intermediate chamber to be decreased. As a cation exchange membrane, a strongly acidic cation exchange membrane with a fluoride resin having —$SO_3^-$ groups, e.g., NAFION (Trade Name; Du Pont) 117 or NAFION 350, or a strongly acidic cation exchange membrane with a styrene-divinyl benzene copolymer having —$SO_3^-$ groups, e.g., NEOCEPTOR CMX (Tokuyama Soda Ltd.) can be used, whereas an anion exchange membrane with fluoride a having negative ion exchange groups, e.g., TOSFLEX IE-SA, TOSFLEX IE-DF and TOSFLEX IE-SF (TOSO Ltd.) or anion exchange membrane based on a styrene-divinyl benzene copolymer, e.g., NEOCEPTOR AMX (Tokuyama Soda Ltd.) can be used as an anion exchange membrane.

As electrodes for the anode or cathode, metals, alloys, metal oxides and the like, or any of the above-mentioned metals, or the like, plated or coated with metal substrates, or such conducting materials as sintered carbon can be used, while plate-shaped, punching plate, mesh or the like can be used as regards shape. Especially, as the material quality of an anode, its excellent acid resistance and non-oxidizability is desirable and accordingly, e.g., Pt, Pd, Ir, $\beta$-$PbO_2$, $NiFe_2O_4$ and the like can be preferably used, whereas excellent base resistance is desirable for a cathode and accordingly using, e.g., Pt, Pd, Au, carbon steel, stainless steel, Ag, Cu, graphite, glassy carbon and the like is preferred.

According to the present invention, highly useful advantages can be obtained as described below.

1) With an electrolytic unit provided with a bypass pipe between the primary purification section and the primary deionized water tank, the electrolytic unit can produce either a microparticle-free and ozone-dissolved anolyte EIW or a hydrogen-dissolved catholyte EIW by applying DC current to deionized water, and the following advantages are obtained:

a. An ozone-dissolved and microparticle-free anolyte EIW can be introduced directly into the primary deionized water tank, and the subsequent units and apparatus in the high-purity water producing equipment, and the circulating piping line can be effectively sterilized without the need to use a chemical or hot water and to blow down after the sterilization. Furthermore, this sterilization can be finished in a very short period of time.

b. By supplying a hydrogen-dissolved and microparticle-free catholyte EIW to be produced simultaneously with the anolyte EIW produced for sterilization, passing it through the high-purity water producing equipment and discharging immediately before the primary deionized water tank, the microparticles sticking to the interior of the primary deionized water tank and the subsequent units and apparatus in the high-purity water producing equipment and the circulating piping line can be removed effectively and in a very short period of time.

c. By adding a dilute hydrochloric acid to the influent to the anode chamber and/or adding a dilute base to the influent to the catalytic chamber, a hypochlorous-ion-dissolved anolyte and hydrogen dissolved catholyte is obtained. By using the anolyte or catholyte EIW as the cleaning solution, the sterilizing effect and the microparticle removing effect can be strengthened, or the scale of an electrolytic unit for achieving the same sterilizing power can be made smaller.

d. In using either one of the anolyte EIW and the catholyte EIW for cleaning the primary deionized water tank and the subsequent units and apparatus in the high-purity water producing equipment and the circulating piping line, the oxidation-reduction potential and the pH can be neutralized without using a new chemical.

According to the present high-purity water producing equipment, it is possible to effectively and very rapidly sterilize the primary deionized water tank, units and apparatus in the secondary purification section, and the circulating piping line, without the need to use a chemical or hot water. Furthermore, the present high-purity water producing equipment can effectively and quickly remove the microparticles sticking to the interior of the primary deionized water tank, units and apparatus in the secondary purification section and the circulating piping line.

2) According to one of the embodiments, an electrolytic unit provided downstream of the branch point of the branch pipe leading to a point of use in the circulatory piping line has a bypass pipe disposed therewith. The circulatory piping line circulates the high-purity water of the treated water of the secondary purification section to the primary deionized water tank. The secondary purification section comprises at least a UV irradiator and a palladium catalyst column located downstream of the UV irradiator. The electrolytic unit can provide either an ozone-dissolved anolyte EIW or a hydrogen-dissolved catholyte EIW without mixing of microprticles or other contaminants by applying DC current to high-purity water. According to this embodiment, the following advantages are obtained:

a. An ozone-dissolved and microparticle-free anolyte EIW can be added directly into the circulatory pipe and the circulating pipe and the primary deionized water tank can always be effectively sterilized without the need to use a chemical or hot water as well as without increasing such contaminants as metals, microparticles and organic matter in the high-purity water flowing the circulatory pipe.

b. When the catalytic unit having a large deoxidizabilty is used for degassing oxygen generated by the decomposition of an excess of ozone with a UV irradiator, by adding the hydrogen-dissolved and microparticle-free catholyte EIW to be produced simultaneously with the anolyte EIW produced for sterilization directly into the point between the UV irradiator and the catalytic unit, oxygen can be removed effectively and at all times without the need to separately install complicated and dangerous installations, such as storage, dissolution apparatus and gas filter for hydrogen gas, as well as without increasing such contaminants as metals, microparticles and organic matter in the high-purity water.

Using a common electrolytic unit, the effects a and b can be simultaneously obtained.

Based on above information, it is possible to provide a high-purity water producing equipment that can sterilize the circulatory pipe on the return side and the primary deionized water tank where living microorganisms are most likely to grow, without mixing any contaminant at all times, that is equipped with no complicated incidental installations, and which enables the frequency of sterilizing the whole circulatory line, involving the use of chemicals and hot water as well as suspension of the equipment operation, to be greatly reduced.

Similarly, it is possible to provide a high-purity water producing equipment that can carry out effective deoxidization without mixing any contaminant simultaneously and at all times as well as without the need to separately install complicated and dangerous installations, such as storage, dissolution apparatus and gas filters for hydrogen gas.

3) According to an embodiment, the secondary purification unit comprises at least a UV irradiator and a palladium catalyst column. The electrolytic unit can yield either an ozone-dissolved anolyte EIW or a hydrogen-dissolved catholyte EIW, which are microparticle-free, by applying DC current to deionized water. Furthermore, an anolyte EIW pipe for adding the anolyte EIW to the upstream end of the UV irradiator and a catholyte pipe for adding the catholyte EIW to the upstream end of the palladium catalyst column is provided. According to the embodiment, the following advantages are obtained:

a. With the secondary purification unit, ozone is dissolved in the deionized water upstream of the UV irradiator. When the dissolved ozone is decomposed under action of UV rays, the sterilization, the ionization of colloidal substances, the decomposition of organic matter are effectively accomplished. In this embodiment, because ozone is generated in the anode chamber and dissolved in the deionized water, a separate ozone generator and ozone dissolution apparatus are not necessary.

b. Catholyte EIW is added to the effluent of the UV irradiator, which is supplied to the catalytic unit. Then, dissolved oxygen can be effectively removed in the catalytic unit at all times. There is no need for separately installing complicated and dangerous installations, such as storage, dissolution apparatus and gas filters for hydrogen gas. Furthermore, it is possible to avoid increasing such contaminants as metals, microparticles and organic matter in the high-purity water.

c. Using a common electrolytic unit, the effects a and b can be simultaneously obtained.

Based on the above, it is possible to provide high-purity water producing equipment that can increase the effectiveness in the sterilization, the ionization of colloidal substances, and the decomposition of organic matter, without mixing any contaminant simultaneously and at all times, as well as without the need to separately install complicated and dangerous installations, such as storage, dissolution apparatus and gas filter for hydrogen gas.

Similarly, it is possible to provide high-purity water producing equipment that can carry out an effective deoxidization without mixing any contaminant simultaneously and at all times, as well as without the need to separately install complicated and dangerous installations, such as storage, dissolution apparatus and gas filters for hydrogen gas.

DETAILED DESCRIPTION OF PREFERRED EMBODIMENTS

Figure 1:
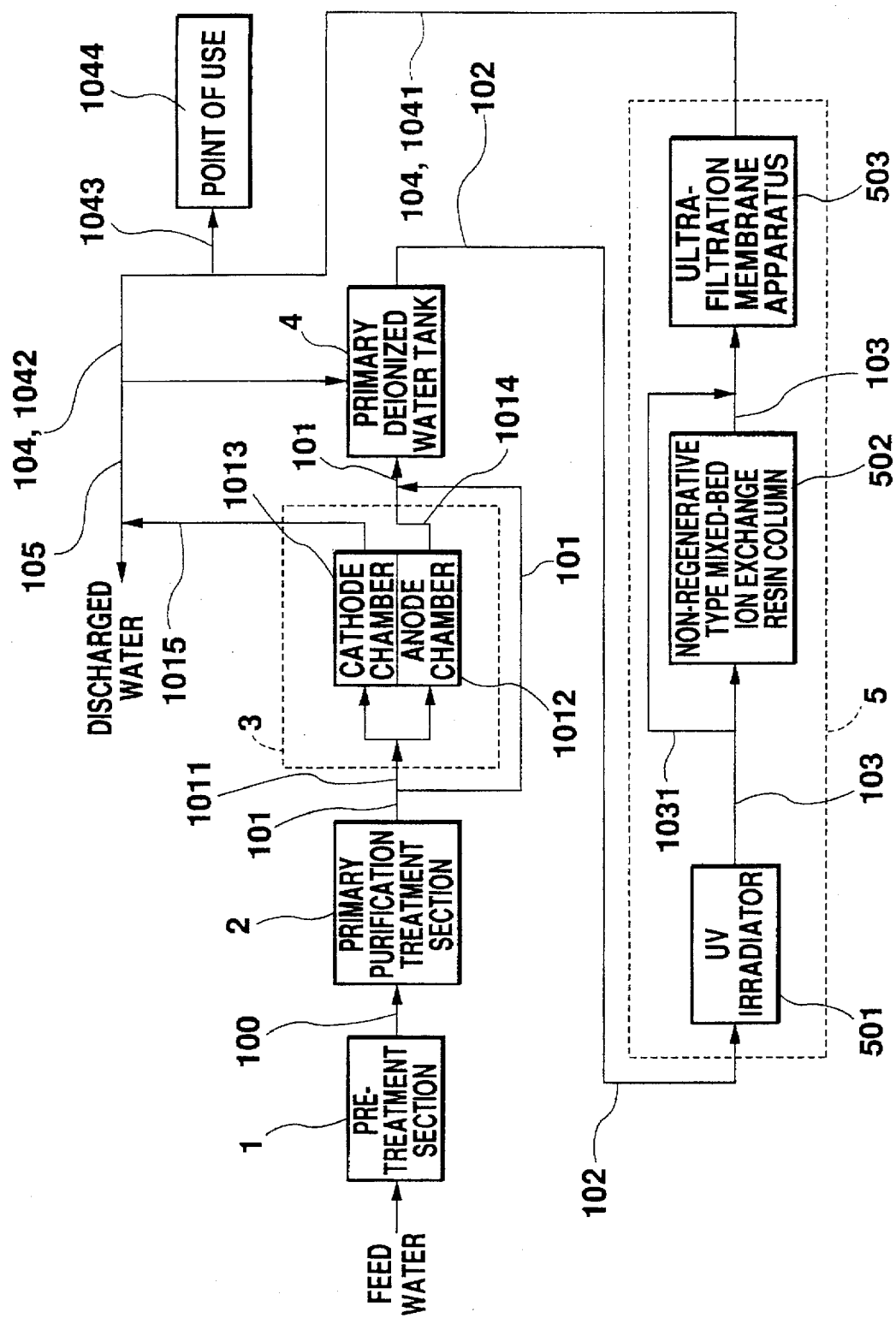
FIG. 1 is an explanatory block diagram showing the outline arrangement of Embodiment 1 of high-purity water producing equipment according to the present invention.

Hereinafter, the present invention will be further described by referring to the drawings.

Embodiment 1

FIG. 1 is a block diagram showing the outline arrangement of a high-purity water producing equipment according to Embodiment 1 of the present invention. Feed water, such as industrial water, is fed to a pretreatment section 1, in which suspended solids and organic matter are partly removed. The treated water subjected to this pretreatment is fed through a pipe 100 to the primary purification treatment section 2 and converted to primary deionized water in this unit. The primary purification treatment section 2 comprises a two-bed ion exchange system (two beds with a degasifier), a reverse osmosis membrane (RO) apparatus, a vacuum degasifier, a regenerative type mixed-bed desalting apparatus or the like (not shown). The primary deionized water obtained by the primary purification treatment section 2 flows into a primary deionized water tank 4 through a pipe 101, to which an electrolytic unit 3 is bypass connected. At the time of intra-system sterilization to be periodically conducted, the aforesaid pipe 101 through which water is passed during normal operation closes a normally opened valve (not shown) to shut off the flow of water, and opens a normally closed valve provided in the bypass pipe 101 to the electrolytic unit 3 to pass the flow of water. A concrete arrangement and operation of the electrolytic unit 3 mentioned above will be described later.

The treated water successively treated by individual apparatus of the primary purification treatment section 2 results in highly purified water (primary deionized water) having a conductivity of not more than 10 µS/cm from which ions and such contaminants as organic matter and microparticles have been removed substantially.

The primary deionized water stored in the primary deionized water tank is sent to a secondary purification treatment section 5 through a pipe 102. A secondary purification treatment section 5 according to this embodiment comprises a UV irradiator 501 for the oxidizing decomposition of organic matter and killing of bacteria in the primary deionized water, a non-regenerative type mixed-bed ion exchange resin column 502 for further removal of trace ions in the primary deionized water, and an ultrafiltration membrane 503 for further removal of microparticles and other contaminants, through all of which high-purity water is obtained from the primary deionized water.

Incidentally, all apparatus in the secondary purification treatment section 5 are connected in sequence by a pipe 103. A bypass pipe 1031 is provided on the non-regenerative type mixed-bed ion exchange resin column 502. During normal operation, water is passed to the non-regenerative type mixed-bed ion exchange resin column 502 through the pipe 103, whereas the flow of water is arranged to be changed over to the side of the bypass pipe 1031 by a change-over valve (not shown) when the intra-system sterilization is performed by actuating the electrolytic unit 3.

In this embodiment, the high-purity water obtained from the secondary purification treatment section 5 is passed to the circulatory pipe 104 constituting a circulatory system for returning it to the primary deionized water tank 4 and sent to a point of use 1044 through a branch pipe 1043 branched off from the midpoint of this circulatory loop. Incidentally, the upstream portion and the downstream portion of the circulatory pipe 104 relative to the branching site are denoted by 1041 and 1042, respectively.

In the high-purity water producing equipment of this embodiment arranged in the above manner, the electrolytic unit 3 is connected to the pipe 1011 and is bypassed by the pipe 101. The electrolytic unit 3 has an anode chamber 1012 having an anode installed therein, and a cathode chamber 1013 having a cathode installed therein, the two chambers being partitioned by a diaphragm in such a manner that the anolyte EIW produced in the anode chamber 1012 by a predetermined electrolysis flows through the outflow pipe 1014 into the pipe 101 and is then sent to the primary deionized water tank 4. In addition, according to this embodiment, the catholyte EIW produced in the cathode chamber 1013 is arranged to be sent via a drain pipe 1015 to a drain pipe 105 branched off from the circulatory pipe 104.

Incidentally, FIG. 1 schematically shows the arrangement of equipment according to the present invention and therefore does not always show the arrangement of practical equipment on an industrial scale. The circulatory pipe 104 extends to hundreds of meters in some cases and generally a branch pipe 1043 branched off from the circulatory pipe 104 and connected to a point of use 1044 for feeding high-purity water thereto also extends as long a distance as tens of meters in some cases. Furthermore, since there may be as many as several tens of points of use 1044, and the number of branch pipes amounts to several dozens, the position of the drain pipe 105 connected to the circulatory pipe 104 is preferably set immediately before the primary deionized water tank 4.

In the high-purity water producing equipment arranged above, the sterilizing treatment using the anolyte EIW produced by the electrolytic unit 3 is performed as follows:

During ordinary operation for producing high-purity water, feed water is passed in the sequence of the pretreatment section 1, pipe 100, primary purification treatment section 2, pipe 101, primary deionized water tank 4, pipe 102, secondary purification treatment section 5 (inside which are arranged a UV irradiator 501, pipe 103, non-regenerative type mixed-bed ion exchange resin column 502, pipe 103 and ultrafiltration apparatus 503) and circulatory pipe 104 (1041 and 1042) and the high-purity water is fed to the point of use 1044 through the branch pipe 1043 from the circulatory pipe 104 and an excess of high-purity water is returned to the primary deionized water tank 4.

Next, during periodic intra-system sterilization cleaning to be repeated at predetermined intervals, the change-over of water flow is performed in the pipe 101 and pipe 103. The primary deionized water from the primary purification treatment unit 2 is fed to the anode chamber 1012 and cathode chamber 1013 of the electrolytic unit 3 through the bypass pipe 1011 and predetermined electrolysis is conducted. Then, the anolyte EIW flows from the outflow pipe 1014 through the primary deionized water tank 4, secondary purification treatment section 5 (but it is passed through the bypass pipe 1031 and not the non-regenerative type mixed-bed ion exchange resin column 502) and the circulatory pipe 104 and drained from the drain pipe 105 to the outside of the system. In this way, the pipes and units through which the anolyte EIW flows are sterilized by the action of the oxidative anolyte EIW. After the sterilization, the piping water flow system is returned to the state of the ordinary operation mentioned above and the blow operation using high-purity water is performed for a predetermined time before recovering the ordinary state of producing high-purity water.

According to the equipment of this embodiment arranged as above, the anolyte EIW for sterilization is produced with the electrolytic unit 3 installed in the system for producing high-purity water by using primary deionized water substantially not contaminated with microparticles, and consequently neither the addition of chemicals from outside the system nor the addition of dissolved ozone from outside the system is performed, unlike in a conventional system, so that there is acquired the advantage that there is absolutely no possibility that microparticles or other contaminants being brought in from outside the system together with sterilization cleaning.

In addition, with this embodiment, the reducing catholyte EIW produced in the electrolytic unit 3 is arranged to flow via the outflow pipe 1015 from the cathode chamber 1013 to the drain pipe 105 and to mix with the anolyte EIW drained from the circulatory system after the completion of sterilization. Thus, the drain water becomes neutral water relieved of its oxidative and reducing power, and no chemicals such as an oxidizing agent or reducing agent need to be added from outside the system, so that there is acquired another advantage of enabling a treatment for discharge or reuse to be performed.

Embodiment 2

Figure 2:
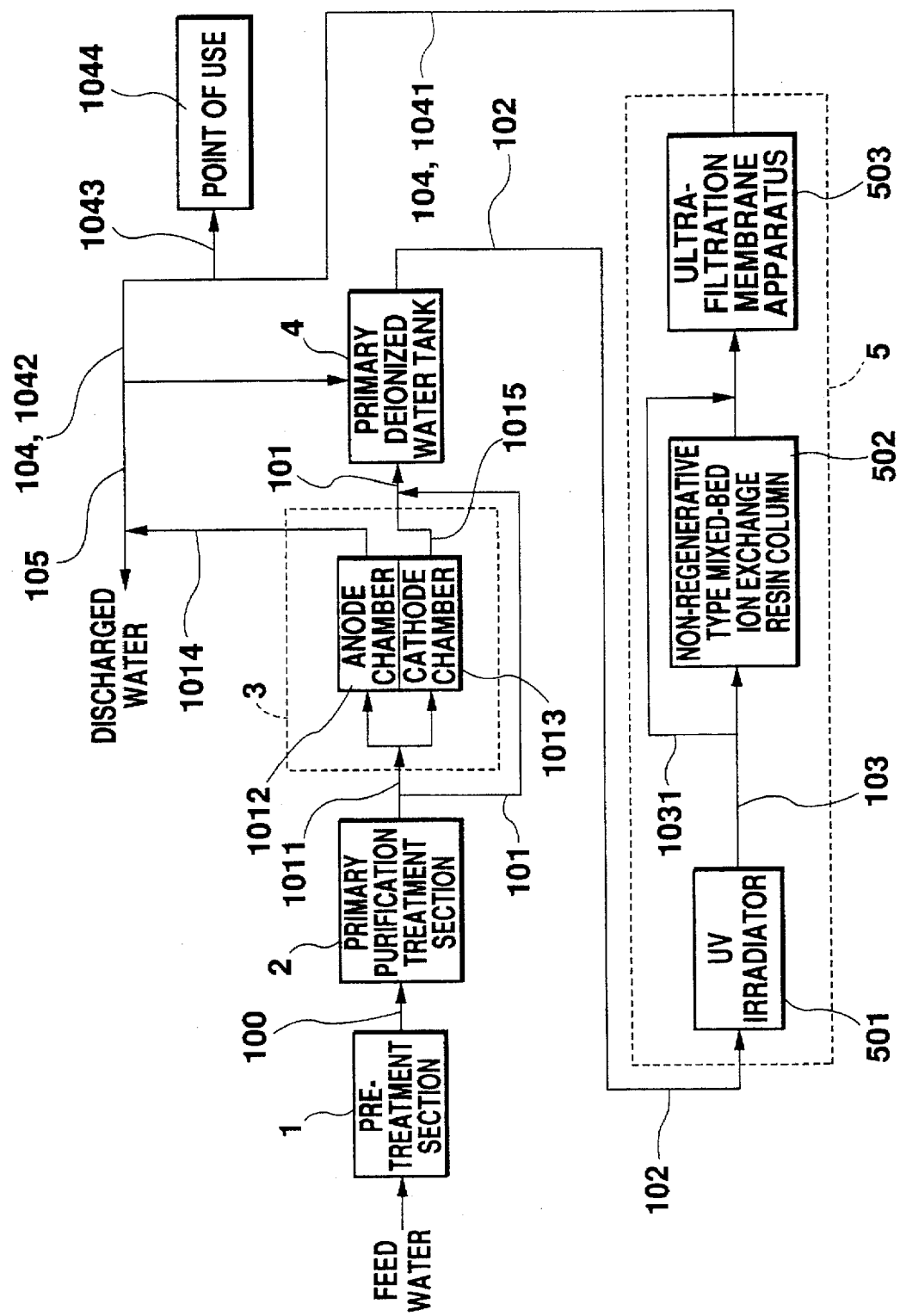
FIG. 2 is an explanatory block diagram showing the outline arrangement of Embodiment 2 of high-purity water producing equipment according to the present invention.

With this embodiment, which is shown in FIG. 2, in contrast to Embodiment 1 in which intra-system sterilization cleaning is performed by using the anolyte EIW of the electrolytic unit 3, the removal cleaning of intra-system sticking microparticles is performed by using the catholyte EIW produced in the cathode chamber 1013 of the electrolytic unit 3, and the catholyte EIW after cleaning is arranged to mix with the anolyte EIW passed to the drain pipe 105 through to the outflow pipe 1014 from the anodic chamber before being discharged to the outside of the system. However, the arrangement of other apparatus and pipes, as well as the change-over operation between the normal operation and the microparticle removal cleaning, are similar to those of Embodiment 1.

According to the high-purity producing equipment of this embodiment, since the catholyte EIW for microparticle removal is produced with an electrolytic unit 3 provided in the system for producing high-purity water by using the primary deionized water substantially not containing microparticles and other contaminants, similarly to Embodiment 1, there is acquired the advantage of there being no possibility that microparticles and other contaminants derived from outside the system are intermixed together with the addition of chemicals or the addition of hydrogen gas. Furthermore, and the advantage based on the joining of the anolyte EIW to the catholyte EIW in the drain pipe is also similarly obtained.

Figure 9:
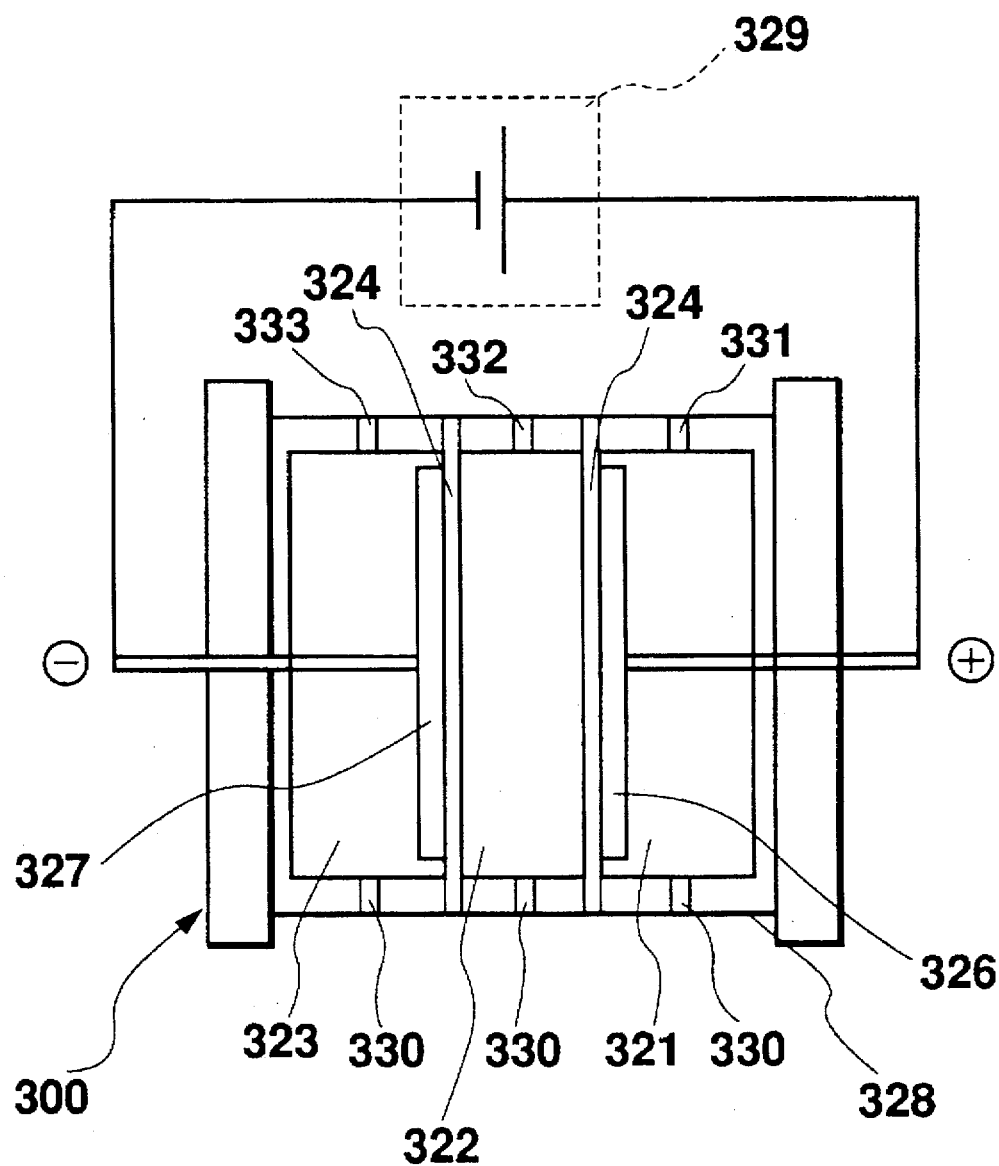
FIG. 9 is a drawing showing the outline arrangement of a three bath type electrolytic unit usable with high-purity water producing equipment according to the present invention.

Concretely, applicable to an electrolytic unit 3 to be used in Embodiments 1 and 2 is, e.g., the three-bath type electrolyzer 300 shown in FIG. 9.

As shown in FIG. 9, this three-bath type electrolyzer 300 has a three-chamber structure, comprising: an anode chamber 321, a cathode chamber 323 and an intermediate chamber 322, partitioned by ion exchange membranes 324, 324 made of solid electrolyte, provided as a partition between these two chambers, to each of which the primary deionized water is fed from its inlet 330, 330, 330. Incidentally, the intermediate chamber 322 is filled with ion exchange resin made of solid electrolyte.

Figure 10:
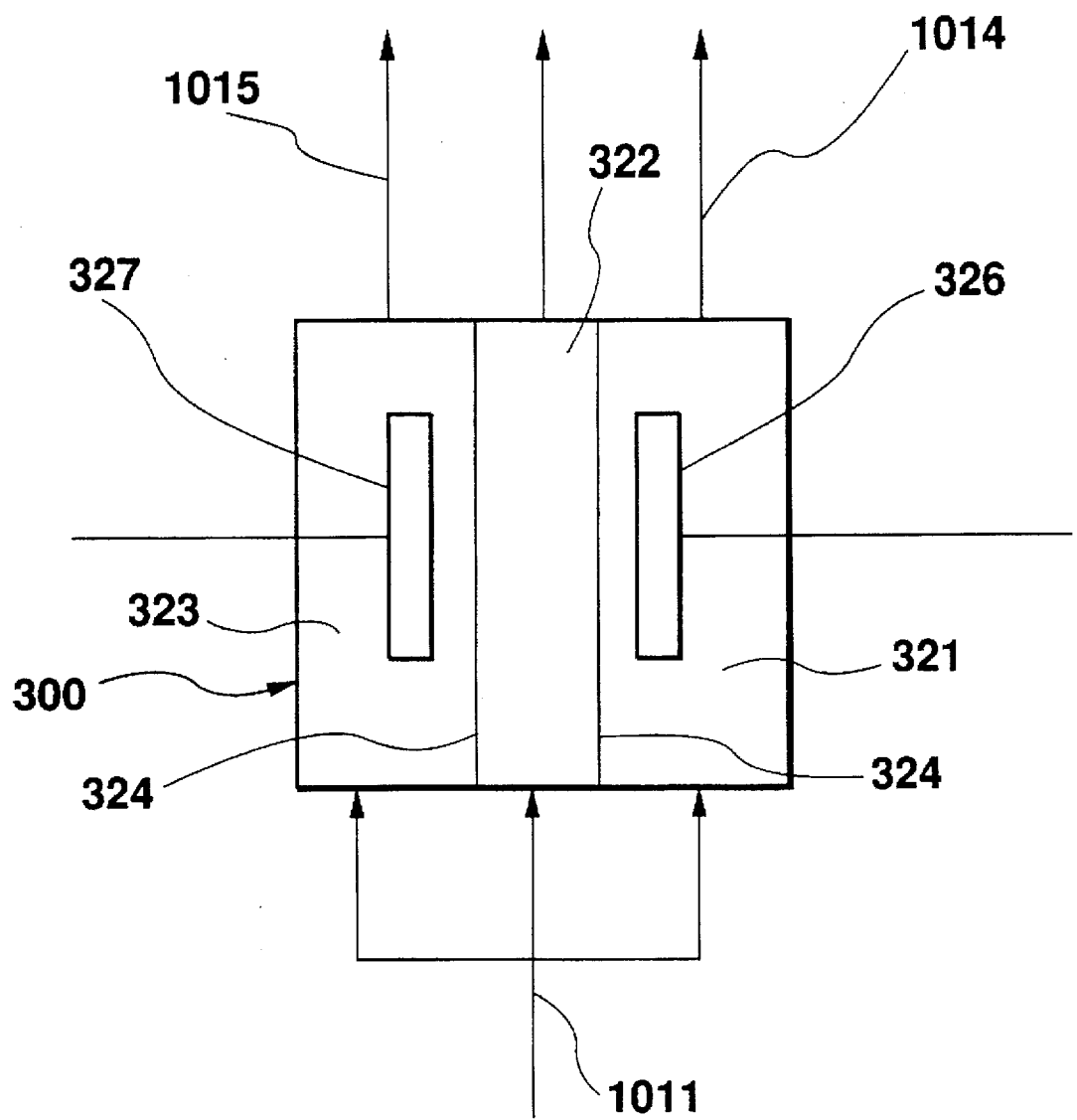
FIG. 10 is a drawing showing the arrangement and the piping flow path of the electrolytic unit of FIG. 9.

As a result of the DC voltage applied between the anode electrode 326 disposed in the anode chamber 321 and the cathode electrode 327 disposed in the cathode chamber 323, the primary deionized water fed is electrolyzed. The anolyte EIW generated flows out from the anolyte outlet 331, whereas the catholyte EIW generated flows out from the catholyte outlet 333. Incidentally, Numerals 332, 328 and 329 denote the outlet of the intermediate chamber 322, the case of the electrolytic chambers and the DC power source, respectively. FIG. 10 is a schematic representation of the piping connection of the three-chamber electrolyzer 300 shown in FIG. 9. From the bypass pipe 1011 of Embodiments 1 and 2, primary deionized water is fed to each of the three chambers and the anolyte EIW produced in the anode chamber 321 is fed through the outflow pipe 1014 thereof to the primary deionized water tank 4 in Embodiment 1, or to the drain pipe 105 in Embodiment 2. On the other hand, the catholyte EIW produced in the cathode chamber 323 is fed through the outflow pipe 1015 thereof to the drain pipe 105 in Embodiment 1 or to the primary deionized water tank 4 in Embodiment 2.

With the electrolyzer 300 of FIG. 9 arranged in this manner, the ion exchange membranes 324, 324 and the ion exchange resin 325 made of solid electrolyte serve as carriers for the transfer of electrons between the electrodes when electrolyzing primary deionized water containing a low concentration of electrolyte, so that the electrolysis of primary deionized water can be accomplished at low voltage. In addition, the intermediate chamber 322 provided between the anode chamber 321 and the cathode chamber 323 prevents the mixing of liquids in the two chambers, so that the anolyte EIW and the catholyte EIW can be effectively produced.

Figure 11:
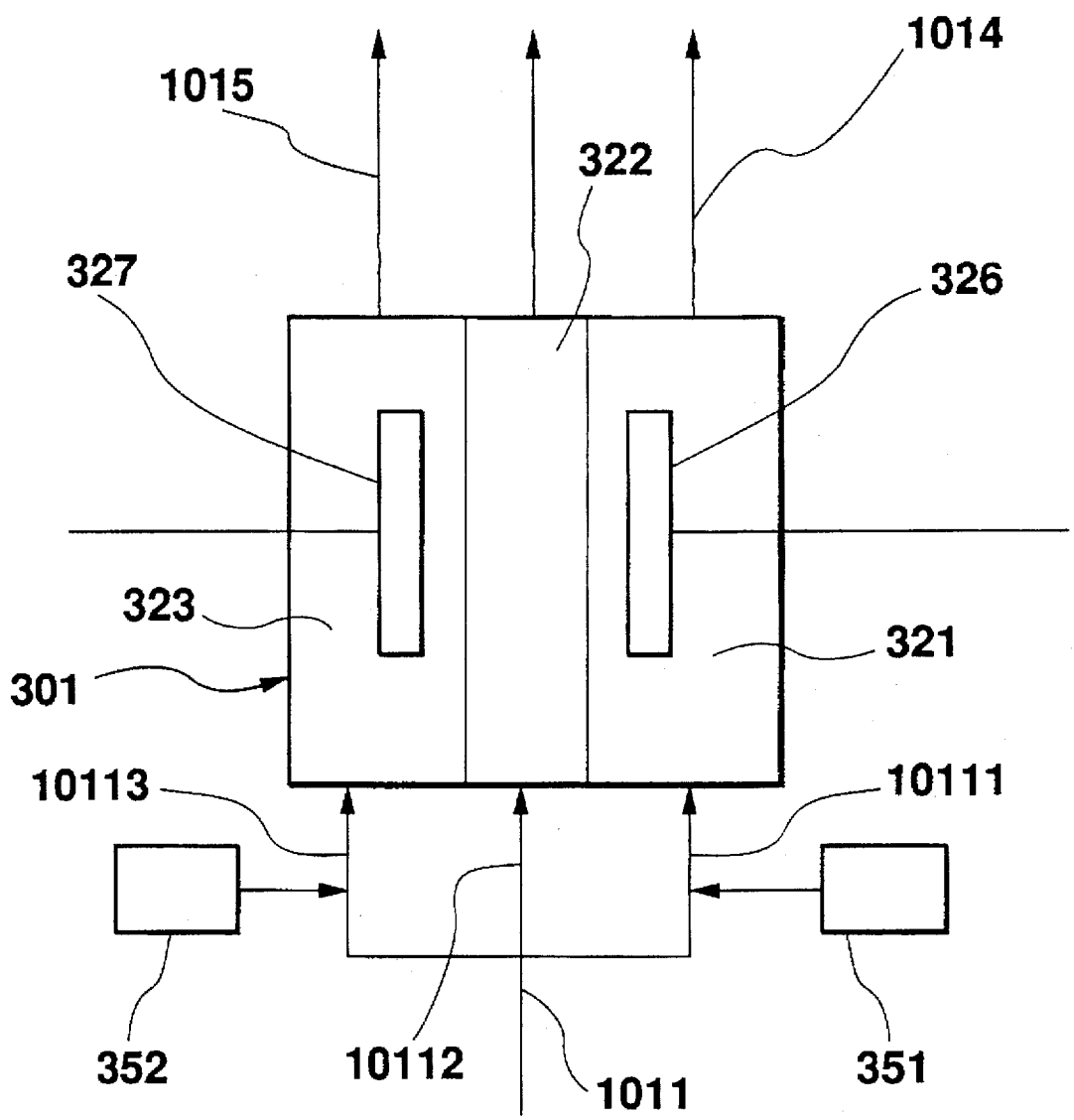
FIG. 11 is a drawing showing one modified example of the electrolytic unit of FIG. 10.
Figure 12:
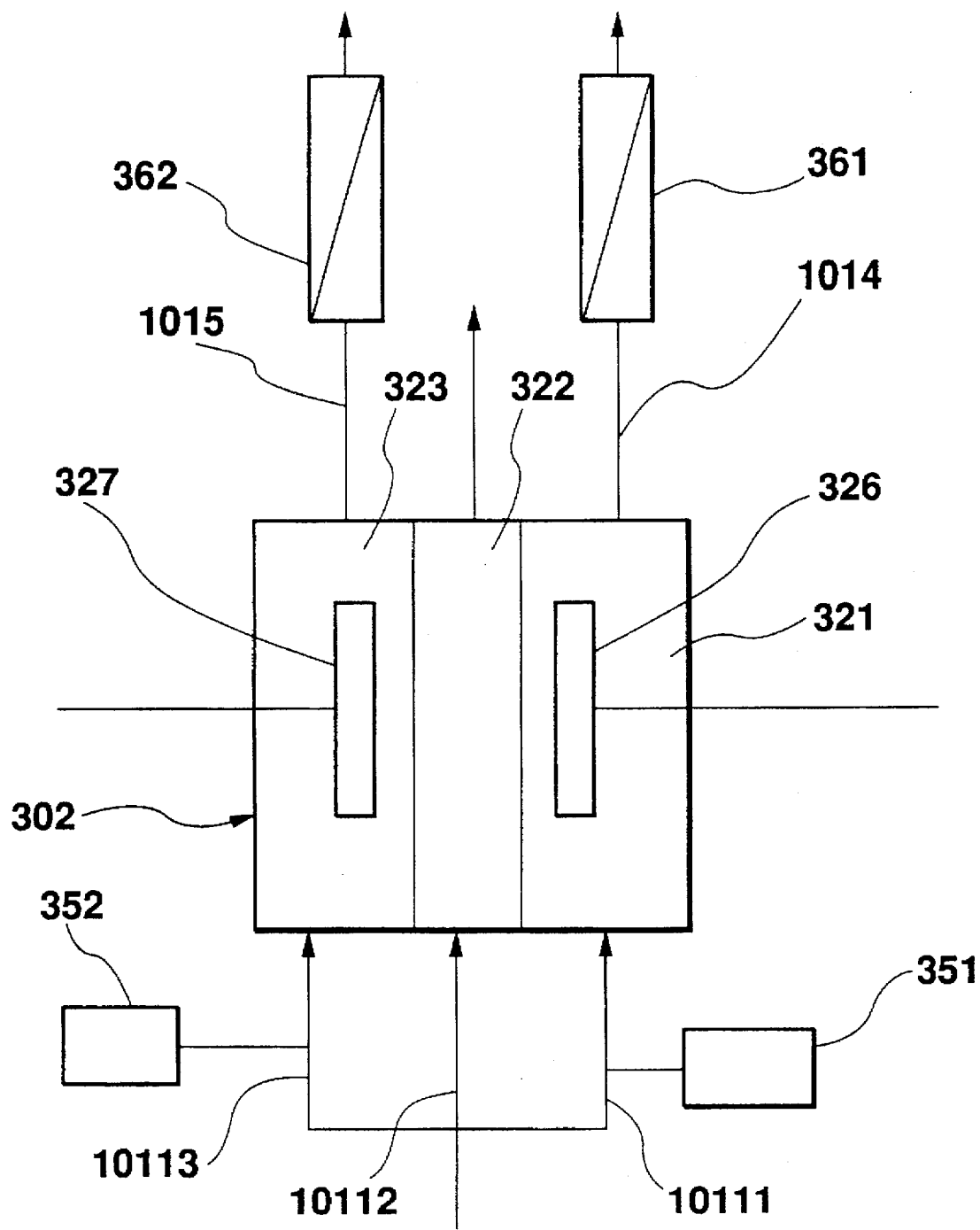
FIG. 12 is a drawing showing another modified example of the electrolytic unit of FIG. 10.
Figure 13:
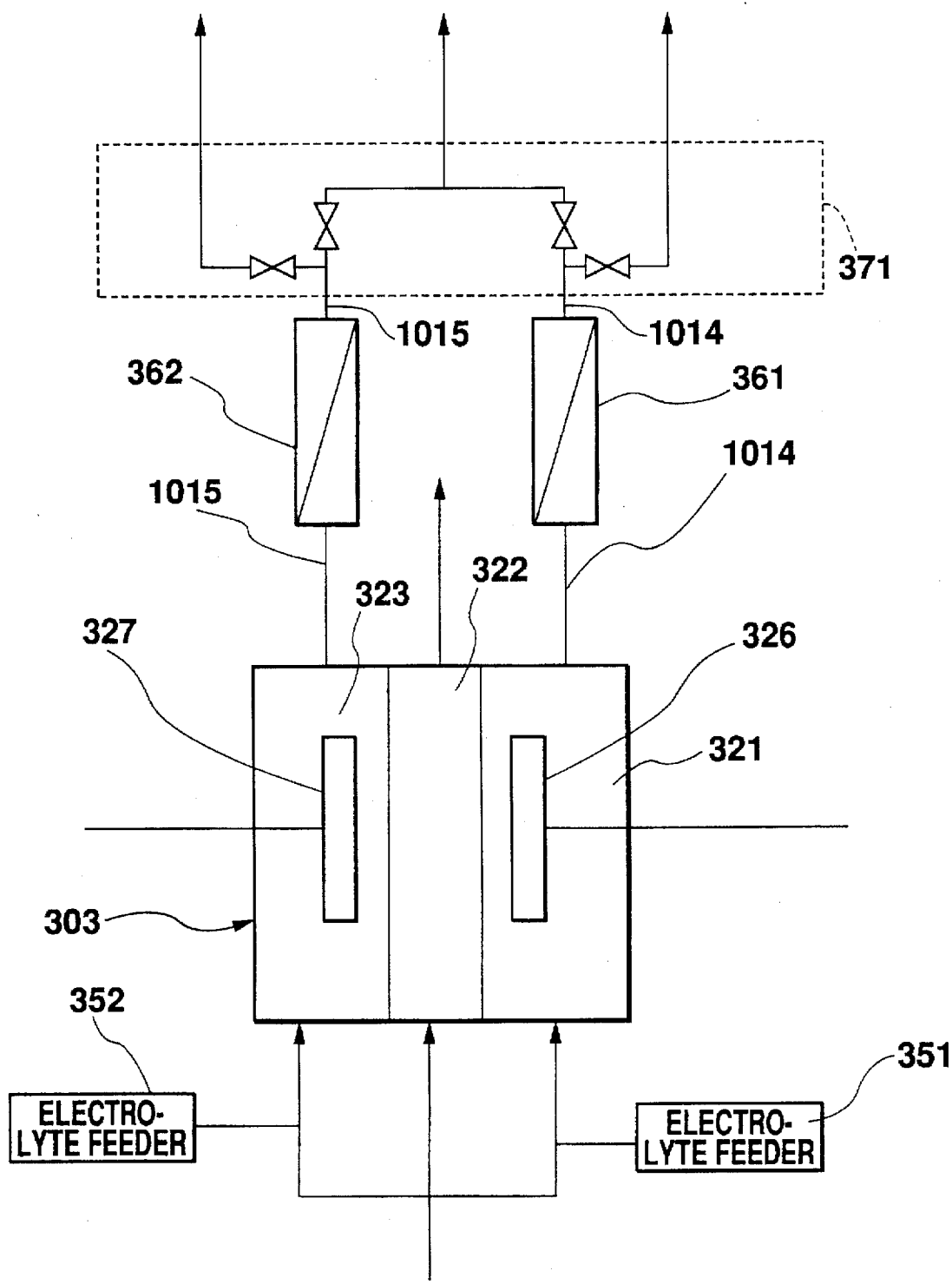
FIG. 13 is a drawing showing a further modified example of the electrolytic unit of FIG. 10.

In place of this electrolyzer 300 of FIGS. 9 and 10, the electrolysis treatment apparatus 301, 302 and 303 shown in FIGS. 11 to 13 or the like, can also be used. In FIG. 11, for the sake of the primary deionized water fed to the electrolyzer 301, an electrolyte feeder 351 is provided for feeding an electrolyte such as a base or an acid to the feed pipe 10111 leading to the anode chamber 321 while an electrolyte feeder 352 is provided for feeding an electrolyte such as a base or an acid to the feed pipe 10113 leading to the cathode chamber 323. In FIG. 12, on the outflow pipes 1014 and 1015 issued from the anode chamber 321 and the cathode chamber 323 in the electrolyzer 302, filters 361 and 362 such as micronic filtration membranes are provided to remove microparticles and other contaminants. In FIG. 13, a change-over section 371 for changing over the connection of outflow pipes 1014 and 1015 of the electrolyzer 303 is provided, so that the anolyte EIW and the catholyte EIW can be separately obtained or can be mixed together. Though not shown, in place of the electrolyzer 300 of FIGS. 9 and 10 another electrolyzer can also be used, in which means for adding an acid or similar substances into the outflow pipe 1014 issued from the anode chamber 321 is provided and means for adding a base or similar substances into the outflow pipe 1015 issued from the cathode chamber 323 is provided, enabling the pH of these EIW products to be adjusted.

Furthermore, in the high-purity water producing equipment of Embodiments 1 and 2 shown in FIGS. 1 and 2, it is preferable to have the outflow pipes 1014 and 1015 of the electrolytic unit 300 each connected to both of the primary deionized water tank 4 and the drain pipe 105 and to change the flow state of water by using a change-over valve. In this way, it is possible to let the anolyte EIW and the catholyte EIW flow through the primary water tank 4 in sequence.

For example, there can be achieved an arrangement wherein the anolyte EIW is allowed to flow through the primary deionized water tank 4 for a predetermined period of time in the state of FIG. 1 at the first stage of intra-system cleaning, then the flow of the anolyte EIW is stopped and the catholyte EIW is allowed to flow through the primary deionized water tank 4. The order of EIW flow can thus be reversed. It is preferable to discharge the EIW on the side of not flowing through the primary deionized water tank 4 to the drain pipe 105.

EXAMPLE 1

Using an electrolyzer 300 in which the feed piping line is arranged so as to be able to change the flow of water from the first state of FIG. 1 over to the second state of FIG. 2, periodic sterilization cleaning and microparticle reduction cleaning of a high-purity water producing equipment was performed under the conditions of Table 1 and the time dependent change in the CFU of microorganisms (number/ml) and the number of microparticles (particles/ml) were determined after the cleaning. Table 2 shows the obtained result.

Incidentally, measurements were made on the discharge water from the drain pipe 105 with the feed of high-purity water to the branch pipe 1043 stopped. After filtering a sample by using living microorganism field monitor MHWGO 3700 (Millipore), adding the filtered sample to M-TGE culture media and culturing it for five days at 25° C., the number of living microorganism colonies was counted (CFU). The number of microparticles in the discharge water was counted by using an in-line microparticle counter SLPC-A (Organo) in accordance with the laser light scattering scheme.

Incidentally, the operation conditions of the electrolytic unit 3 were as follows:

Feed water flow rate: 0.1 m$^3$/hr for each chamber

Current density: 30 mA/cm$^2$

Ozone concentration in the anolyte EIW: 5000 ppb

Hydrogen concentration in the catholyte EIW: 3000 ppb

TABLE 1

Cleaning for sterilization and microparticle removal performed during stop of the regular operation of a secondary purification treatment unit.

| Example 1 | Reference example 1 |
|---|---|
| 1: Operation stop of the secondary purification section 5<br>Change-over of CP flowing route<br>*Opening of the CP bypass pipe 1031<br>*Closing of the CP feed pipe 103 | 1: Operation stop of the secondary purification section 2<br>the same as Example 1 |
| 2: Operation start of the electrolytic unit 3<br>2-1: (4 hours)<br>The anolyte EIW mixed with the primary deionized water is passed through the primary deionized water tank 4 and the secondary purification treatment section 5; anolyte EIW then blown from the drain pipe 105 connected to the circulatory pipe 104 to the outside.<br>(0.1 m$^3$/h anolyte + 0.9 m$^3$/h primary deionized water)<br>During this period of time, the catholyte EIW is fed to the drain pipe 105.<br>(0.1 m$^3$/h catholyte)<br>2-2: (4 hours)<br>The catholyte EIW mixed with the primary deionized water is passed through the primary deionized water tank 4 and the secondary purification treatment section 5; catholyte EIW then blown from the drain pipe 105 connected with the circulatory pipe 104 to the outside.<br>(0.1 m$^3$/h catholyte EIW + 0.9 m$^3$/h primary deionized water)<br>During this period of time, the anolyte EIW is fed to the drain | 2: Water feed start of the cleaning liquid tank<br>(8 hours)<br>1% hydrogen peroxide water (H$_2$O$_2$) is adjusted, passed through the primary deionized tank; then circulated in the system.<br>(0.1 m$^3$/h) |

TABLE 1-continued

Cleaning for sterilization and microparticle removal performed during stop of the regular operation of a secondary purification treatment unit.

| Example 1 | Reference example 1 |
|---|---|
| pipe 105. (0.1 m³/h anolyte) | |
| 3: Operation stop of the electrolytic unit 3 (1 hour) Cleaning with deionized water | 3: Water feed stop of the cleaning liquid tank (16 hours) Cleaning with deionized water (0.1 m³/h) |
| 4: Restart of regular operation of the secondary purification section 5 *Closing of the CP bypass pipe 1031 *Opening of the CP feed pipe 103 (Regular operation) Feed water flow rate of the secondary purification unit 5 (1 m³/h) Quantity consumed at a point of use (0.8 m³/h) Quantity returned to the primary deionized water tank 4 (0.2 m³/h) | 4: Restart of regular operation of the secondary purification section 5. (Regular operation) Feed water flow rate of the secondary purification unit 5 (1 m³/h) Quantity consumed at a point of use (0.8 m³/h) Quantity returned to the primary deionized water tank 4 (0.2 m³/h) |

In the above table, Symbol CP denotes a non-regenerative type mixed-bed ion exchange resin column.

As can be clearly seen from these results, it was confirmed in Example 1 that, in compared with Reference example 1, decrease in the number of microparticles proceeds rapidly and hardly any increase in the number of living microorganisms could be found even for 30 days of water feed (regular operation).

Embodiment 3

Figure 3:
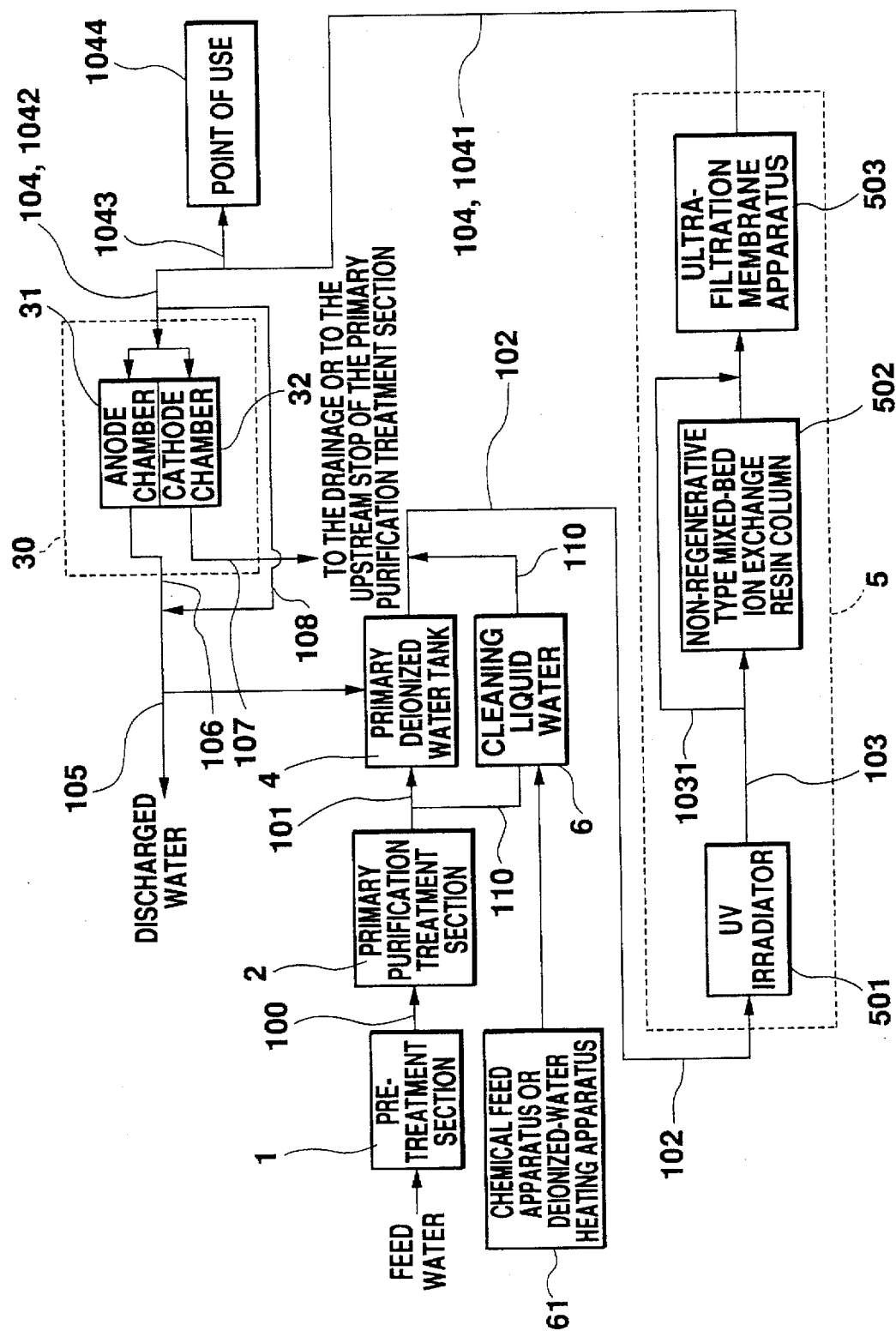
FIG. 3 is an explanatory block diagram showing the outline arrangement of Embodiment 3 of high-purity water producing equipment according to the present invention.

With the high-purity water producing equipment of this embodiment, which is shown in FIG. 3, the electrolytic unit 3 of Embodiment 1 shown in FIG. 1 is omitted and an electrolytic unit 30 is disposed on the return side (1042) of the circulatory pipe 104. From the anode chamber 31 of the electrolytic unit 30, the anolyte EIW is passed to the primary deionized water tank 4 and further a cleaning liquid tank 6 is provided on the bypass pipe 110 to bypass the primary deionized water tank 4. Via this cleaning liquid tank 6, chemicals or hot water from chemical feed means (or hot water feed means) 61 for regular cleaning are arranged to flow through the primary deionized water tank 4. Incidentally, since other units and apparatus and the arrangement of piping lines are similar to those of Embodiment 1, like symbols are attached to like units, apparatus and pipes, and the description thereof will be omitted.

On the other hand, the catholyte EIW from the cathode chamber 32 of the electrolytic unit 30 is arranged so as to be discharged from the drain pipe 107 or to be returned to a point midway on the primary purification section 2 or downstream thereof. A bypass route 108 is provided to bypass this electrolytic unit 30. While a bypass route 1031 to the secondary purification section 5 is that through which water is passed at the time of chemical cleaning.

TABLE 2

Number of living microorganisms and microparticles in the high-purity water after the restart of regular operation in the secondary purification section

| Time elapsed after the restart of regular operation in the secondary purification section | | Example 1 | | Reference example 1 | |
|---|---|---|---|---|---|
| Day | Hour | Number of living microorganisms (col./ml) | Number of microparticles, 0.1 μm or more in size (particles/ml) | Number of living microorganisms purification unit (col./ml) | Number of microparticles, 0.1 μm or more in size (particles/ml) |
| | 1 hr | 0 | 27 | 0 | 372 |
| | 2 | 0 | 7 | 1 | 185 |
| | 3 | 1 | 1 | 0 | 111 |
| | 5 | 0 | 2 | 1 | 56 |
| | 15 | 0 | 0 | 1 | 28 |
| | 24 | 0 | 1 | 1 | 21 |
| 2 days | | 0 | 0 | 1 | 7 |
| 3 | | 0 | 1 | 1 | 19 |
| 5 | | 1 | 0 | 3 | 7 |
| 10 | | 1 | 0 | 3 | 1 |
| 20 | | 4 | 0 | 10 | 1 |
| 30 | | 5 | 0 | 23 | 0 |

Figure 14:
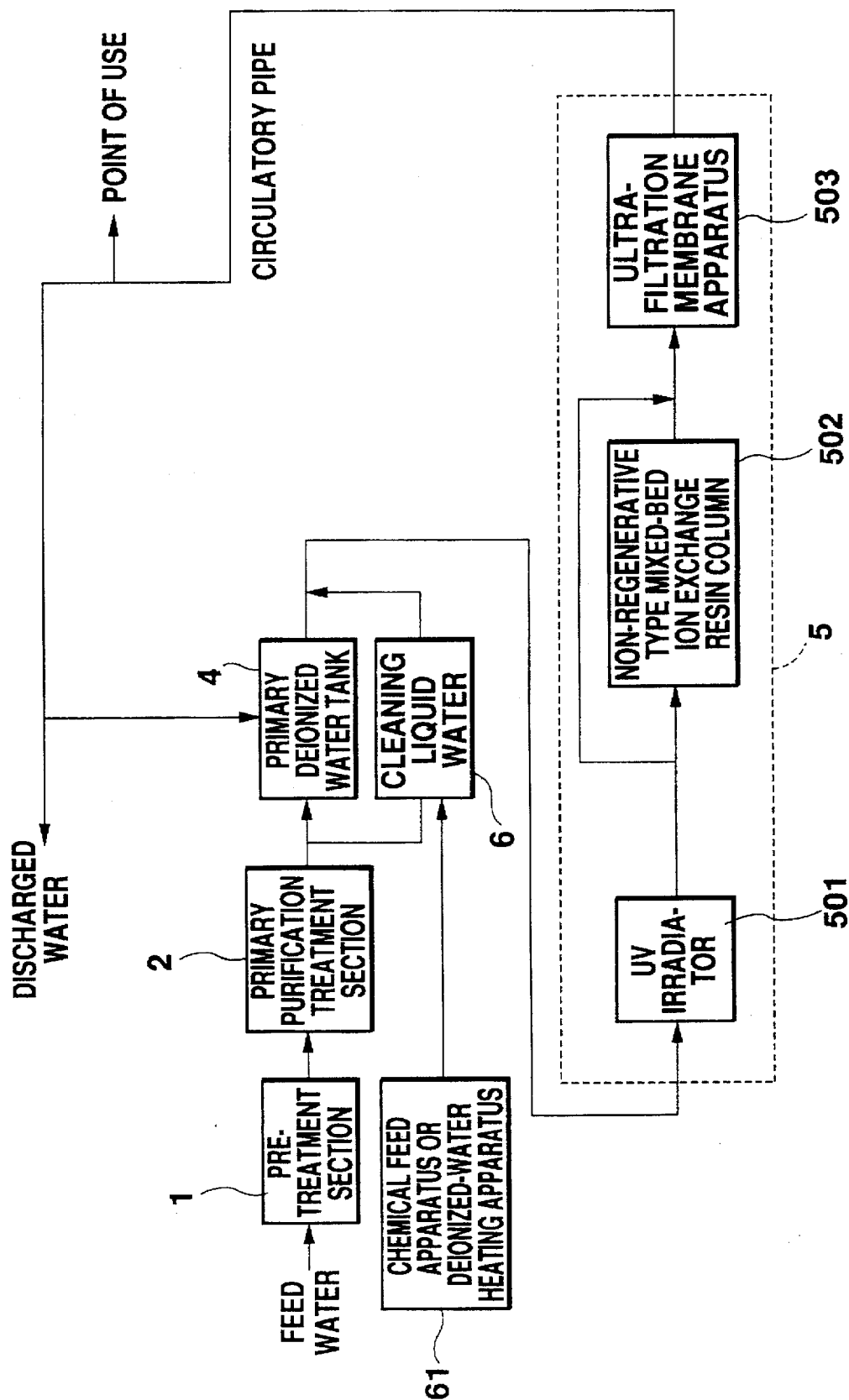
FIG. 14 is an explanatory block diagram showing the outline arrangement of conventional high-purity water producing equipment.

In the comparative example, after preparing the conventional high-purity water producing equipment shown in FIG. 14, constructing the equipment in such a manner that the deionized water obtained in a pretreatment section or a first purification treatment section under the same conditions as those of the reference 1 can be passed therethrough and a high-purity water can be produced and executing the cleaning treatment for the sterilization using the chemicals mentioned in Table 1 and for the reduction of microparticles, time dependent change in the number of living microorganisms (number/ml) and of microparticles (particles/ml) was examined. The above table 2 shows the obtained results.

One feature of this embodiment lies in that a continuous sterilization of the return-side circulatory pipe 1042 and the primary deionized water tank 4, not formerly executed on an industrial scale, can be implemented.

That is, with an equipment according to this embodiment, the apparatus (6, 61, 110) provided for treatment with chemicals, intra-system sterilization and microparticle removal cleaning are similar to those of a conventional equipment, but using the electrolytic unit 30 provided on the circulatory pipe 104 enables a decrease in the frequency of regular cleaning.

With this embodiment, the anolyte of the electrolytic unit 30 is passed via the outflow pipe 106, the primary deionized water tank 4 and the pipe 102 to the secondary purification unit 5. Then, by UV irradiation of the UV irradiator 501 provided in this secondary purification section 5, ozone is decomposed into oxygen. This embodiment is equipped with no apparatus for degassing the relevant dissolved oxygen but is applicable without any problem to a case where the oxygen dissolved in high-purity water produced by a continuous operation causes no inconvenience.

Embodiment 4

Figure 4:
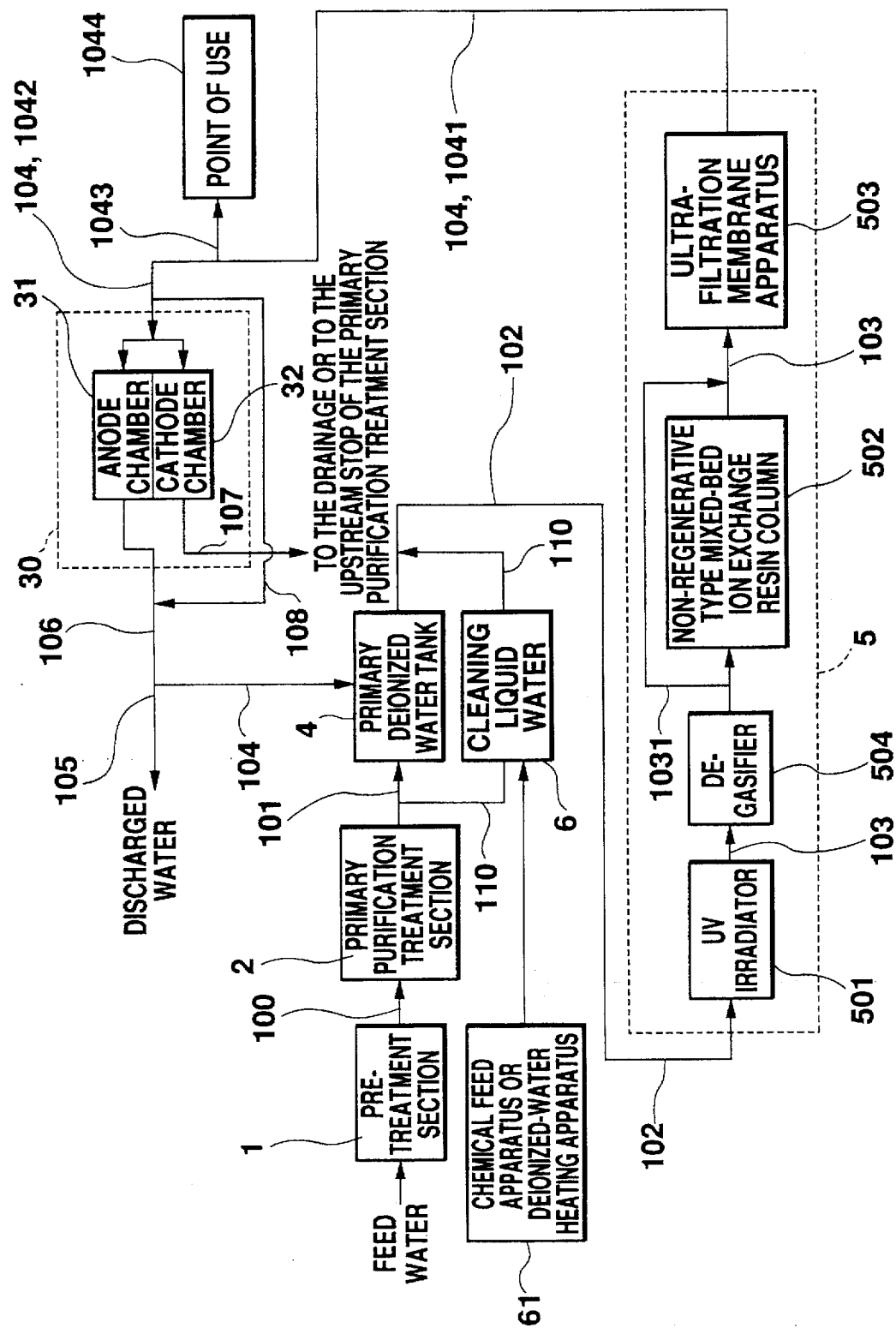
FIG. 4 is an explanatory block diagram showing the outline arrangement of Embodiment 4 of high-purity water producing equipment according to the present invention.

The high-purity water producing equipment of this embodiment which is shown in FIG. 4, differs from that of Embodiment 3 only in that a degasifier 504 is provided at the downstream end of the UV irradiator 501 in the secondary purification section 5, but otherwise it has substantially the same arrangement as that shown in FIG. 3. Thus, like symbols are attached to like units, apparatus and pipes, and the description thereof will be omitted.

According to this embodiment, the dissolved oxygen resulting from ozone decomposition by the UV irradiator 501 can be removed by the degasifier 504. Thus, this embodiment is effective for applications in which the presence of dissolved oxygen is critical. Incidentally, as the degasifier, for example, a membrane degasifier using a gas permeable membrane made of PTFE or of silicon rubber material, or a vacuum degasifier is preferred.

Embodiment 5

Figure 5:
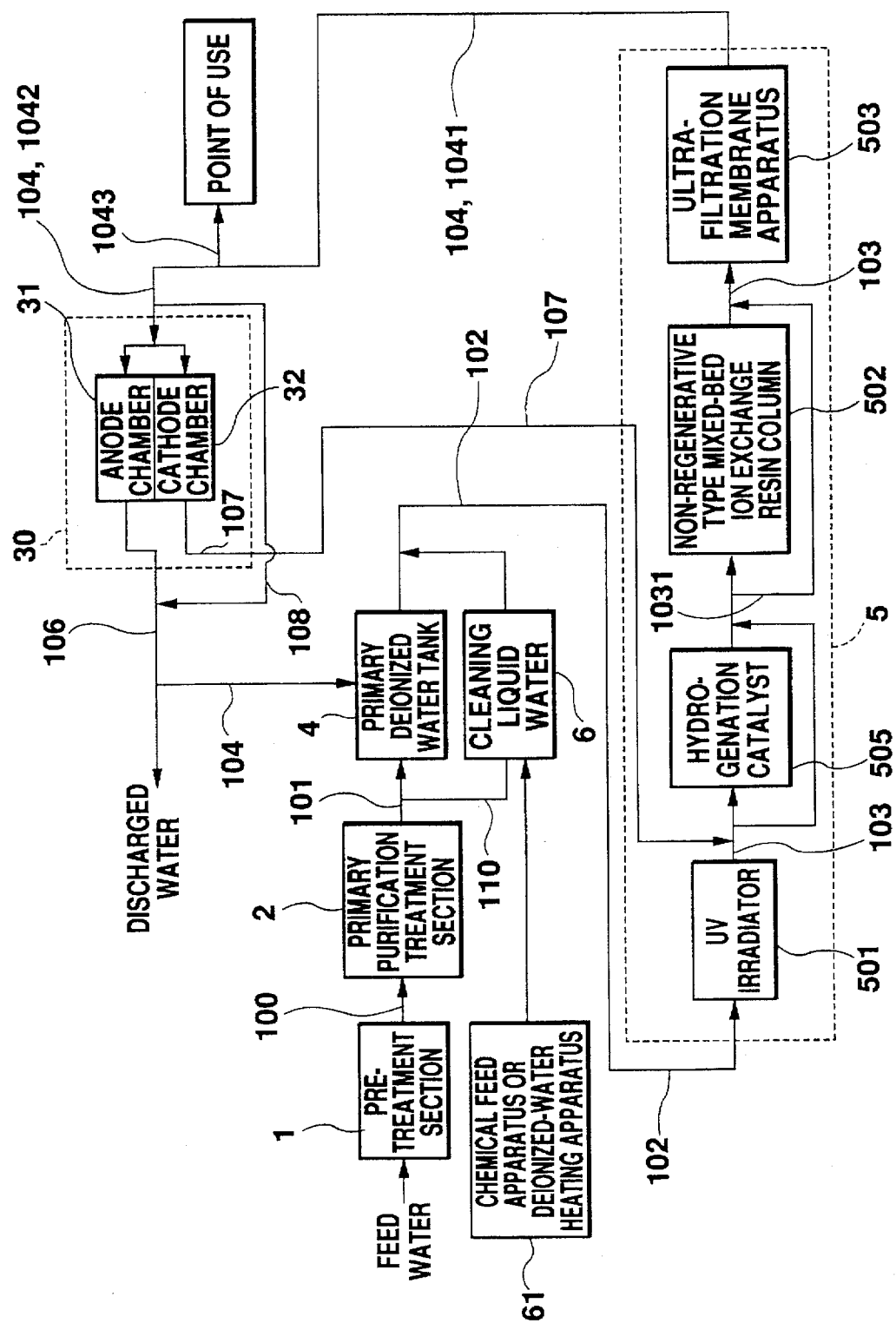
FIG. 5 is an explanatory block diagram showing the outline arrangement of Embodiment 5 of high-purity water producing equipment according to the present invention.

The high-purity water producing equipment of this embodiment, which is shown in FIG. 5, differs from that of Embodiment 4 shown in FIG. 3 only in that a hydrogenation catalysis column 505 is provided at the downstream end of the UV irradiator 501 in the secondary purification unit 5. The catholyte EIW from the outflow pipe 107 of the cathode chamber 32 in the electrolytic unit 30 is added to the effluent of the UV irradiator 501 at the upstream end of the hydrogenation catalyst column 505. Otherwise this embodiment has substantially the same arrangement as that shown in FIG. 3. Thus, like symbols are attached to like units, apparatus and pipes and the description thereof will be omitted. Incidentally, as the hydrogenation catalysis, for example, metal palladium bearing resin AMBERLIST (Trade Name) ER-206 is preferable.

According to this embodiment, since the hydrogen-containing catholyte EIW is mixed with the treated water in which the oxygen resulting from ozone decomposition by the UV irradiator 501 is contained, these easily react with each other to form water in the hydrogenation catalyst column 505 and consequently the dissolved oxygen is removed. Thus, this embodiment is effective for applications in which the presence of dissolved oxygen is critical. In addition, a hydrogenation catalyst column according to this embodiment is more advantageous in the downsizing of apparatus than the degasifier of Embodiment 4, and is superior in that the catholyte EIW produced from the high-purity water can be utilized without waste.

Reference 2

With a modified arrangement of this embodiment shown in FIG. 5 in which the electrolytic unit 30 used in the high-purity water producing equipment of FIG. 5 is replaced with the electrolytic unit 300 shown in FIGS. 9 and 10, after a long period of operation while the deionized water obtained in the primary deionized water producing unit was passed through the relevant equipment, chemical sterilization (1% hydrogen peroxide) was carried out and a 60 day regular operation was repeated twice under the conditions of Table 3. Then, the number of living microorganisms (number/ml) and the concentration of dissolved oxygen (µg O/l) at the branch position to a point of use, as well as the concentration of dissolved oxygen (µg O/l) at the upstream end of the degasifier, were examined. The following table 4 shows the obtained results. A method for measuring the number of living microorganisms is the same as with Reference 1 and the concentration of dissolved oxygen was measured with an in-line dissolved oxygen meter (TOA Denpa K.K.).

Incidentally, the operating conditions of the electrolytic unit 30 were set as follows:

Feed water flow rate: 0.1 m$^3$/hr for each chamber

Current density: 5 mA/cm$^2$

Ozone concentration in the anolyte EIW: 200 µg/l

Hydrogen concentration in the catholyte EIW: 100 µg/l

TABLE 3

Sterilization performed during the stop of the regular operation of a secondary purification treatment section.

| | Example 2 | Compared example 2 | Compared example 3 |
| --- | --- | --- | --- |
| Step 1 | Stop operation of the secondary purification section 5 and Start water feed with sterilizing chemicals (8 hours) Circulation of 1% hydrogen peroxide water (0.1 m$^3$/h) (16 hours) Cleaning with deionized water | the same as Example 2 | the same as Example 2 |
| Step 2 | Restart of regular operation (60 days) Flow rate of feed water through the secondary purification section 5 (1 m$^3$/h) Quantity consumed at a point of use (0.8 m$^3$/h) Quantity returned to the primary deionized water tank 4 (0.2 m$^3$/h) At the same time, continuous operation of the electrolytic unit 30; production of the anolyte and the catholyte EIW by using the returned water to the above deionized water tank (0.1 m$^3$/h) for each | the same as Example 2 | the same as Example 2 At the same time, injection of ozone into the ozone dissolution apparatus of the circulatory line (20 mg/h) injection of hydrogen into the hydrogen injection apparatus (10 mg/h) |
| Step 3 | Repetition of the above step 1 | | |
| Step 4 | Repetition of the above step 2 | | |

TABLE 4

Number of living microorganisms and Concentration of dissolved oxygen in the high-purity water after the restart of regular operation of the secondary purification unit

| Time elapsed after the restart of regular operation in the secondary purification unit | Number of living microorganisms (col./ml) | | | Concentration of dissolved oxygen (μg O/l) | | | | |
|---|---|---|---|---|---|---|---|---|
| | Example 2 | Comparative example 2 | Comparative example 3 | Example 2 | | Comparative example 2 | Comparative example 3 | |
| | | | | Pre degassing | Post degassing | | Pre degassing | Post degassing |
| Step 2 was executed for each example after the completion of Step 1 | | | | | | | | |
| (Day) 1 | 0 | 0 | 0 | 43 | <1 | 22 | 45 | <1 |
| 3 | 0 | 0 | 1 | 45 | <1 | 22 | 48 | <1 |
| 7 | 0 | 1 | 0 | 42 | <1 | 24 | 40 | <1 |
| 20 | 0 | 5 | 1 | 42 | <1 | 21 | 42 | <1 |
| 30 | 1 | 14 | 0 | 41 | <1 | 21 | 41 | <1 |
| 60 | 0 | 112 | 2 | 43 | <1 | 21 | 45 | <1 |
| Step 4 was executed for each example after the completion of Step 3 | | | | | | | | |
| (Day) 1 | 0 | 0 | 0 | 40 | <1 | 21 | 45 | <1 |
| 3 | 0 | 2 | 1 | 41 | <1 | 22 | 50 | <1 |
| 7 | 0 | 7 | 1 | 42 | <1 | 22 | 41 | <1 |
| 20 | 0 | 15 | 0 | 43 | <1 | 23 | 45 | <1 |
| 30 | 1 | 25 | 1 | 41 | <1 | 22 | 42 | <1 |
| 60 | 0 | 98 | 1 | 41 | <1 | 23 | 41 | <1 |

Comparative Examples 2 and 3

Figure 15:
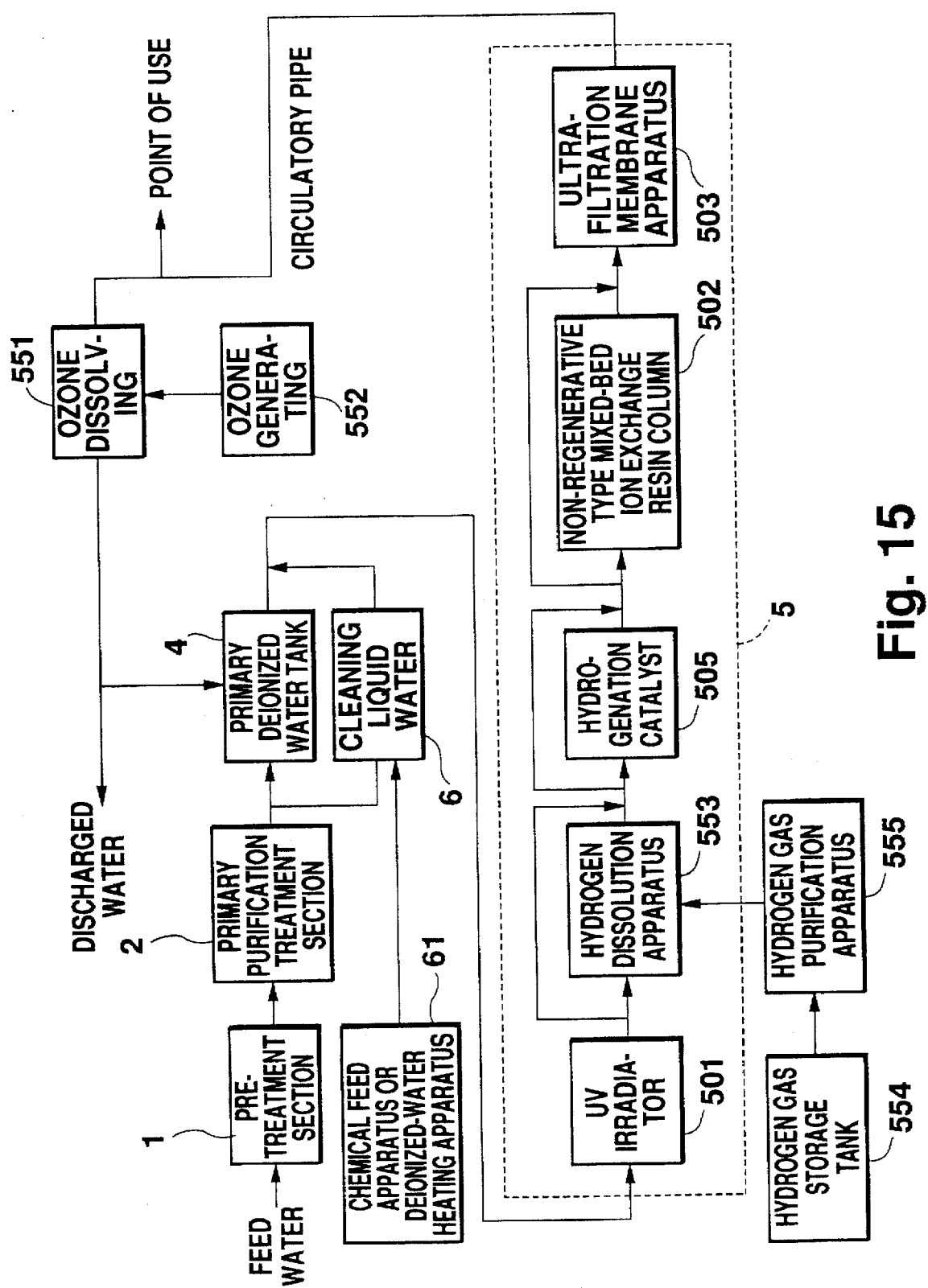
FIG. 15 is an explanatory block diagram showing the outline arrangement of another conventional high-purity water producing equipment.

For the purpose of comparison, by using the conventional high-purity producing equipment shown in FIG. 14 and that shown in FIG. 15, a periodic cleaning and a regular operation were carried out under the same conditions as those of Reference 2. Then, the number of living microorganisms (number/ml) and the concentration of dissolved oxygen (μg O/l) at the branch position to a point of use as well as the concentration of dissolved oxygen (μg O/l) at the upstream end of the degasifier, were examined in a similar manner. The above table 4 shows the obtained results.

As can be clearly seen from these results, it was verified that Example 2 can obtain the effect of sterilization as with Comparative example 3 in spite of the fact that there is no addition of ozone or oxygen from outside the system and further that it exhibited absolutely no increase in the number of living microorganisms even for 60 days after the completion of periodic sterilization and maintained an extremely low concentration of dissolved oxygen, or not higher than 1 μg/l.

Embodiment 6

Figure 6:
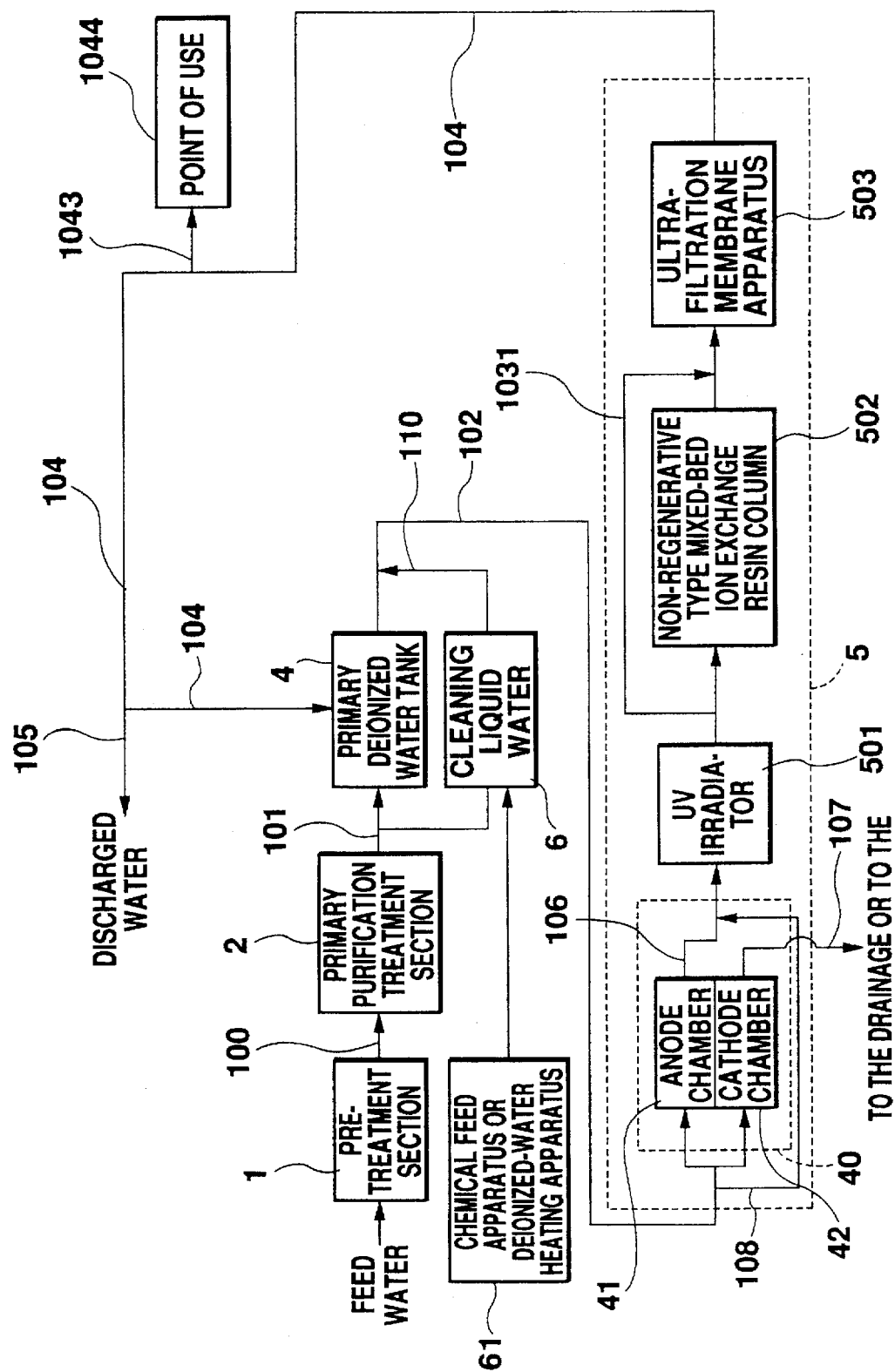
FIG. 6 is an explanatory block diagram showing the outline arrangement of Embodiment 6 of high-purity water producing equipment according to the present invention.

With the high-purity water producing equipment of this embodiment, which is shown in FIG. 6, the electrolytic unit 3 of Embodiment 1 shown in FIG. 1 is omitted and an electrolytic unit 40 is disposed at the upstream end of the UV irradiator 501 of the secondary purification unit 5, to which the anolyte EIW from the anode chamber 41 of the electrolytic unit 40 is arranged to flow. Furthermore, a cleaning liquid tank 6 is provided on a bypass pipe 110 arranged to bypass the primary deionized water tank 4. Via this cleaning liquid tank 6, chemicals or hot water from chemical feed means (or hot water feed means) 61 for regular cleaning are arranged to flow through the primary deionized water tank 4. Incidentally, since other units and apparatus and the arrangement of piping line are similar to those of Embodiment 1, like symbols are attached to like units, apparatus and pipes and the description thereof will be omitted.

On the other hand, the catholyte EIW from the cathode chamber 42 of the electrolytic unit 40 is arranged to be discharged from the drain pipe 107 or to be returned to an upstream step of the first purification section. A bypass route 108 is provided to bypass this electrolytic unit 40, while a bypass route 1031 to the secondary purification section 5 is one through which water is passed at the time of chemical cleaning.

A high-purity water producing equipment according to this embodiment is similar to a conventional equipment in that the intra-system sterilization is performed by periodic cleaning with chemicals or the like, but still has an advantage that ozone-containing anolyte EIW can be fed to the UV irradiator 501, thereby assisting in effective decomposition of organic matter and the like, and that colloidal silica, though hardly removed by ion exchange treatment, can be ionized and consequently becomes easily removable by ion exchange in a downstream step.

Embodiments 7 and 8

Figure 7:
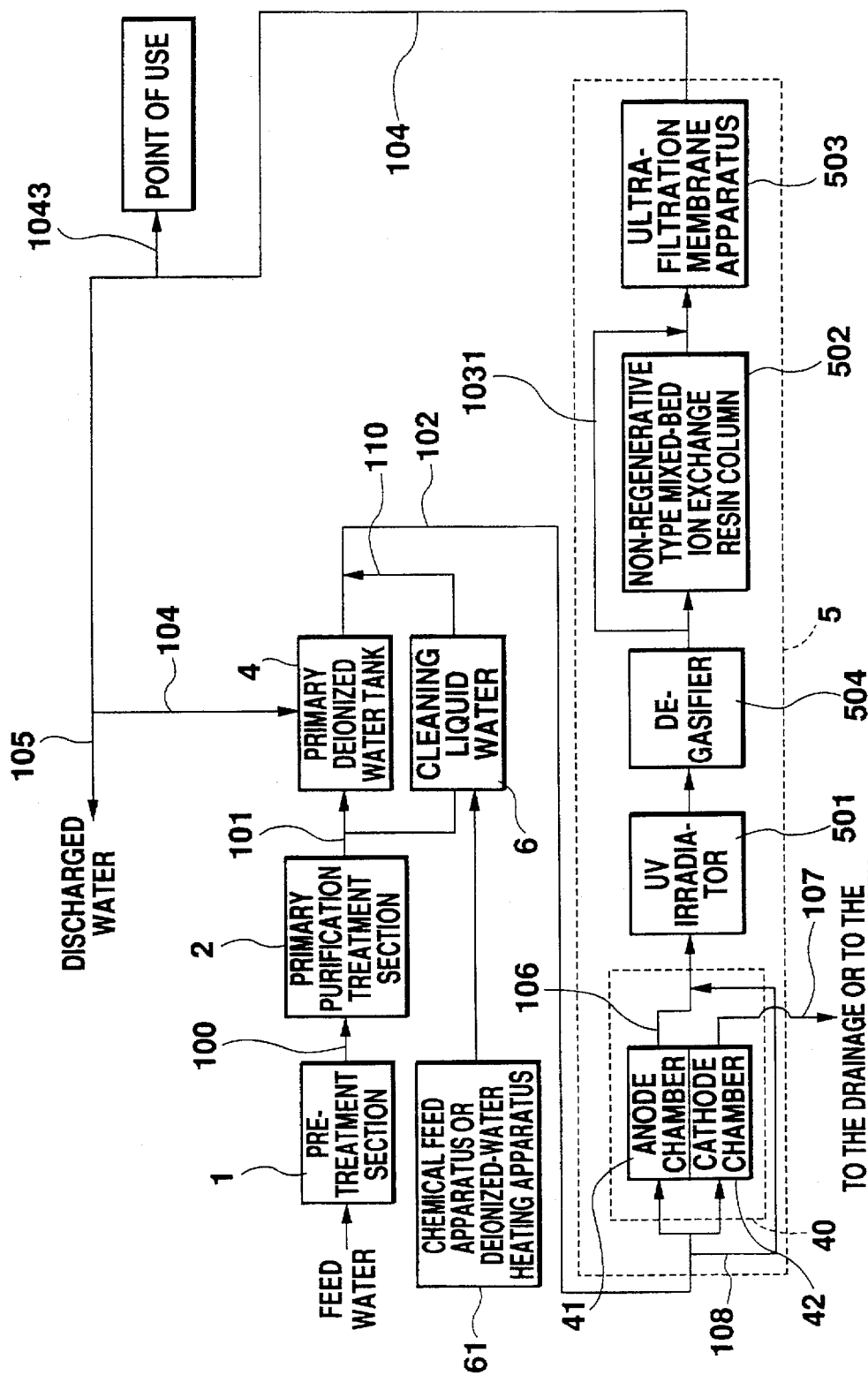
FIG. 7 is an explanatory block diagram showing the outline arrangement of Embodiment 7 of high-purity water producing equipment according to the present invention.
Figure 8:
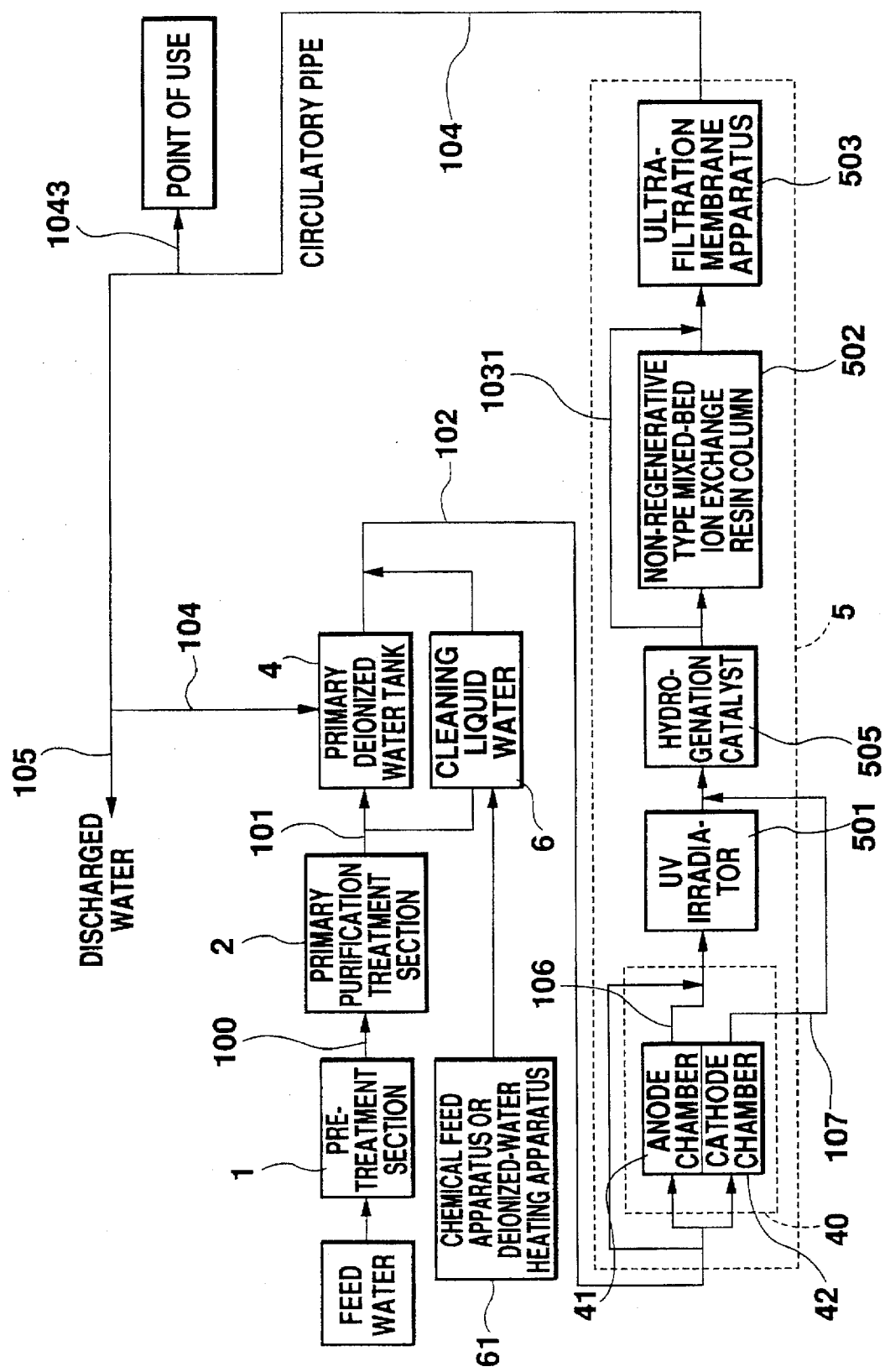
FIG. 8 is an explanatory block diagram showing the outline arrangement of Embodiment 8 of high-purity water producing equipment according to the present invention.

The high-purity water producing equipment of Embodiment 7, which is shown in FIG. 7 has an arrangement in which a degasifier 504 is provided at the downstream end of the UV irradiator 501, corresponding to that of FIG. 4 representative of Embodiment 4. On the other hand, the high-purity water producing equipment of Embodiment 8 shown in FIG. 8 has an arrangement in which a hydrogenation catalysis column 505 is provided at the downstream end of the UV irradiator 501 in the secondary purification section 5 and the catholyte EIW from the outflow pipe 107 of the cathode chamber 42 in the electrolytic unit 40 is added to the effluent of the UV irradiator 501 at the upstream end of the hydrogenation catalyst column 505, corresponding to that of FIG. 5 representative of Embodiment 5.

Except for these points, high-purity water producing equipment according to either of Embodiments 7 and 8 has substantially the same arrangement as with that shown in FIG. 6. Thus, like symbols are attached to like units, apparatus and pipes, and the description thereof will be omitted.

By having these degassing means provided, the same advantages as described in Embodiments 4 and 5 are obtained in addition to those of Embodiment 6.

EXAMPLES 3 TO 5

With modified arrangements of Embodiments 6 to 8, in which the electrolytic unit 30 used in the respective high-purity water producing equipment of FIGS. 5 to 7 is replaced with the electrolytic unit 300 shown in FIGS. 9 and 10, after a long period of operation while the deionized water obtained in the primary deionized water producing section was passed through the relevant equipment, chemical sterilization (1% hydrogen peroxide) was carried out, and a 7 day regular operation was conducted. Then, the water quality was examined at the outlet position of the ultrafiltration membrane apparatus.

The items of measurements on water quality were electrical resistivity, total organic carbon (TOC), ionic silica, non-ionic silica, total evaporation residue, number of microparticles, number of living microorganisms, metals (Na, Fe, Cu), chloride ions and dissolved oxygen. Measurements were made with electrical resistivity meter AQ-11 (Denki Kagaku Keisoku K.K.) for electric resistivity; silica meter SA-500 (Toray Engineering Inc.) for ionic silica; ICP-MS, PMS 32000 (Yokogawa Electric Corp.) for total silica and metals; total evaporation residue meter TS-100 (Organo) for total evaporation residue; and ion chromatographic analyzer IC-7000 (Yokogawa Electric Corp.) for chloride ions; respectively. Incidentally, measurements on microparticles, living microorganisms and dissolved oxygen are similar to those for Comparative examples 1 and 2, and further, a value of non-ionic silica was determined by subtracting a value of ionic silica from a value of total silica. The following table 5 shows the obtained results.

In addition, the operating conditions are set to those of Example 1.

TABLE 5

| | Ref. 3 | Ref. 4 | Ref. 5 | Cont. 4 |
|---|---|---|---|---|
| Electrical resistivity MΩ · cm | 18.24 | 18.24 | 18.24 | 18.24 |
| TOC μg C/l | <0.5 | <0.5 | <0.5 | 1.2 |
| Ionic silica μg $SiO_2$ | <0.2 | <0.2 | <0.2 | <0.2 |
| Non-ionic silica μg SiO | <1 | <1 | <1 | 2 |
| Total evaporation residue μg/l | <1 | <1 | <1 | 3 |
| Number of microparticles (particles/ml) | 0 | 0 | 0 | 12 |
| Number of living microorganisms | 0 | 0 | 0 | 2 |
| Na μg/l | <0.003 | <0.003 | <0.003 | <0.003 |
| Fe μg/l | <0.005 | <0.005 | <0.005 | <0.005 |
| Cu μg/l | <0.005 | <0.005 | <0.005 | <0.005 |
| Cl⁻ μg/l | <0.05 | <0.05 | <0.05 | <0.05 |
| Dissolved oxygen μg O/l | 152 | 5 | <1 | 25 |

Comparative Example 4

For the purpose of comparison, by using the conventional high-purity producing equipment shown in FIG. 14, periodic cleaning and a regular operation were carried out under the same conditions as those of Reference 3. Then, the same items to be measured with respect to water quality were examined. The above table 4 shows the obtained results.

As can be clearly seen from these results, it was verified that, in comparison with Comparative Example 4, Embodiments 6 to 8 exhibited a decrease in TOC, non-ionic silica, total evaporation residue, microparticles and living microorganisms and that Embodiments 7 and 8 equipped with a degasifier further exhibited a decrease to an extremely low concentration in dissolved oxygen also.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A process for producing high-purity water comprising:
   A) a pretreatment comprising removing suspended solids contained in feed water to provide pretreated water;
   B) a primary purification treatment comprising removing ions and non-ionic substances from the pretreated water obtained in said pretreatment step to provide primary deionized water;
   C) a secondary purification treatment comprising subjecting the primary deionized water to at least one of ion exchange treatment and membrane separation treatment;
   D) electrolyzing either the primary water deionized, or the treated water during the progress of secondary purification treatment, to produce an electrolytic ionized water (EIW) product; and
   E) transferring at least a portion of the EIW product for cleaning equipment used in the secondary purification treatment.

2. The process for producing high-purity water according to claim 1, wherein (D) comprises electrolyzing the primary deionized water.

3. The process for producing high-purity water according to claim 1, wherein (D) comprises electrolyzing secondary deionized water.

4. The process for producing high-purity water according to claim 1, wherein (D) is conducted after interrupting the secondary purification treatment.

5. The process of claim 1, further comprising (F) cleaning equipment used in the secondary purification treatment with the EIW product.

6. Equipment for producing high-purity water comprising:
   A) a pretreatment unit for removing suspended solids contained in feed water;
   B) a primary purification treatment unit for removing ions and non-ionic substances from the pretreated water obtained in said pretreatment unit to provide primary deionized water;
   C) a secondary purification treatment unit for subjecting primary deionized water to at least one of ion exchange treatment, and membrane separation treatment to provide secondary deionized water;
   D) an electrolytic unit for electrolyzing at least a portion of primary deionized water or secondary deionized water to produce EIW (electrolytic ionized water); and
   (E) EIW transferring equipment for feeding EIW obtained by said electrolytic unit to the secondary purification treatment unit for cleaning part of the secondary purification treatment unit.

7. The equipment according to claim 5, further comprising a changeover unit for alternately feeding anolyte EIW and catholyte EIW obtained by said electrolytic unit to the secondary purification treatment unit to be cleaned.

8. The equipment according to claim 6, wherein (E) transfers either anolyte EIW or catholyte EIW obtained by said electrolytic unit to the secondary purification treatment unit to be cleaned.

9. The equipment according to claim 8, wherein (E) transfers anolyte EIW to the secondary purification treatment unit to be cleaned.

10. The equipment according to claim 9, further comprising equipment for mixing the catholyte EIW with waste catholyte EIW.

11. The equipment according to claim 8, wherein (E) transfers catholyte EIW to the secondary purification treatment unit to be cleaned.

12. The equipment according to claim 11, further comprising equipment for mixing the anolyte EIW with waste catholyte EIW.

13. The equipment according to claim 6, further comprising transfer equipment for feeding primary deionized water to said electrolytic unit.

14. The equipment according to claim 6, further comprising transfer equipment for feeding secondary deionized water to said electrolytic unit.

15. The equipment according to claim 14, further comprising:

a circulatory pipe for circulating a part of secondary deionized water in the upstream end of the secondary purification treatment unit, wherein said electrolytic unit carry out electrolysis with the secondary purified water in this circulatory pipe used as feed water, and the obtained EIW is circulated through the circulatory pipe in the upstream end of the secondary purification treatment unit.

16. The equipment according to claim 6, wherein said secondary purification treatment unit is equipped with a UV irradiator and feeds the anolyte EIW obtained by said electrolytic unit to said UV irradiator and cleans said UV irradiator.

17. The equipment according to claim 16, further comprising:

a circulatory pipe for circulating a part of secondary deionized water in the upstream end of said secondary purification treatment unit, wherein said electrolytic unit carry out the electrolysis, with the secondary deionized water in this circulatory pipe used as feed water, and the obtained anolyte EIW is fed to said UV irradiation apparatus.

18. The equipment according to claim 16, wherein said secondary deionized treatment unit is equipped with deoxidation apparatus behind the UV irradiator.

19. The equipment according to claim 18, wherein said deoxidation apparatus includes:

a mixing device for mixing the catholyte EIW obtained by the electrolytic unit with disposal water from the UV irradiator; and a hydrogenating treatment device provided behind this mixing device for executing hydrogenation with a hydrogenating catalyst.

20. The equipment according to claim 6, wherein said electrolytic unit adds an electrolyte or electrolytes to the feed water to be electrolyzed before electrolysis.

21. The equipment according to claim 6, wherein said secondary purification treatment unit comprises:

an ion exchanger for ion exchange treatment; and a bypass route for bypassing said ion exchanger, said equipment causing the EIW to flow through said bypass and bypassing the ion exchanger when feeding the EIW to the secondary purification unit.

22. The equipment according to claim 6, wherein said electrolytic unit comprises:

an anode chamber for housing the anode; a cathode chamber for housing the cathode; and an intermediate chamber located between the anode chamber and the cathode chambers; while ion exchange membranes form partitions between the anode and intermediate chambers and between the cathode and intermediate chambers, ion exchange resin is filled in at least the intermediate chamber, the anode is in contact with the ion exchange membrane partitioning the intermediate chamber and the anode chamber, and the cathode is in contact with the ion exchange membrane partitioning the intermediate chamber and the cathode chamber.

23. The equipment according to claim 22, wherein said electrolytic unit is equipped with a filter for filtering the water obtained by electrolysis.

* * * * *